(12) United States Patent
Solondz

(10) Patent No.: US 9,220,013 B2
(45) Date of Patent: Dec. 22, 2015

(54) TUNE CONTROL FOR SHARED ACCESS SYSTEM

(71) Applicant: VERIZON PATENT AND LICENSING INC., Basking Ridge, NJ (US)

(72) Inventor: Max A. Solondz, New Vernon, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 144 days.

(21) Appl. No.: 14/174,308

(22) Filed: Feb. 6, 2014

(65) Prior Publication Data

US 2015/0223069 A1 Aug. 6, 2015

(51) Int. Cl.
*H04L 29/06* (2006.01)
*H04W 12/08* (2009.01)
*H04W 16/14* (2009.01)
*H04W 24/02* (2009.01)
*H04W 28/04* (2009.01)

(52) U.S. Cl.
CPC .............. *H04W 12/08* (2013.01); *H04W 16/14* (2013.01); *H04W 24/02* (2013.01); *H04W 28/048* (2013.01)

(58) Field of Classification Search
CPC ..... H04W 12/08; H04W 16/14; H04W 24/02; H04W 28/048
USPC .......................................................... 380/270
See application file for complete search history.

(56) References Cited

U.S. PATENT DOCUMENTS

| | | | | |
|---|---|---|---|---|
| 5,467,294 A * | 11/1995 | Hu | ........................ | G06F 1/0328 327/106 |
| 5,703,950 A * | 12/1997 | Jovanovich | .............. | H04K 3/20 380/249 |
| 8,112,238 B1 * | 2/2012 | Gorin | ..................... | G01R 23/16 324/76.19 |
| 8,966,527 B1 * | 2/2015 | Godwin | ........... | H04N 21/23897 705/14.4 |
| 9,043,827 B1 * | 5/2015 | Rapoport | ................ | G06F 21/10 380/200 |
| 2005/0195887 A1 * | 9/2005 | Paquelet | .............. | H04B 1/7174 375/146 |
| 2005/0201559 A1 * | 9/2005 | Van Der Heijden | ... | H04N 7/163 380/239 |
| 2008/0233891 A1 * | 9/2008 | Rofougaran | ............ | H03F 3/211 455/76 |
| 2013/0051555 A1 * | 2/2013 | Martch | ..................... | H04N 5/76 380/210 |

OTHER PUBLICATIONS

'IEEE 802.11y-2008'. Wikipedia [online] [retrieved on Apr. 8, 2014]., IEEE 802.11y-2008. Wikipedia [online] [retrieved on Apr. 8, 2014].

* cited by examiner

*Primary Examiner* — Michael S McNally

(57) ABSTRACT

Devices and methods are provided for implementing a shared radio frequency spectrum allocation system. Access points and end user devices in an Authorized Shared Access System are allowed to access a channel of the shared radio frequency spectrum managed by an Authorized Shared Access System controller. Access points provide a communication, or frequency, channel over which similarly configured end user devices obtain access to data networks for client devices. Secure access to the allocated channel of the shared radio frequency spectrum is provided, thereby preventing rogue devices from gaining uncontrolled, or unauthorized, access to a channel of the shared radio frequency spectrum that may result in interference with other users of the channel including higher priority users. A secure synthesizer and secure encrypted tuning control words uniquely and securely control local channel usage.

20 Claims, 11 Drawing Sheets

200

400

500A

500B

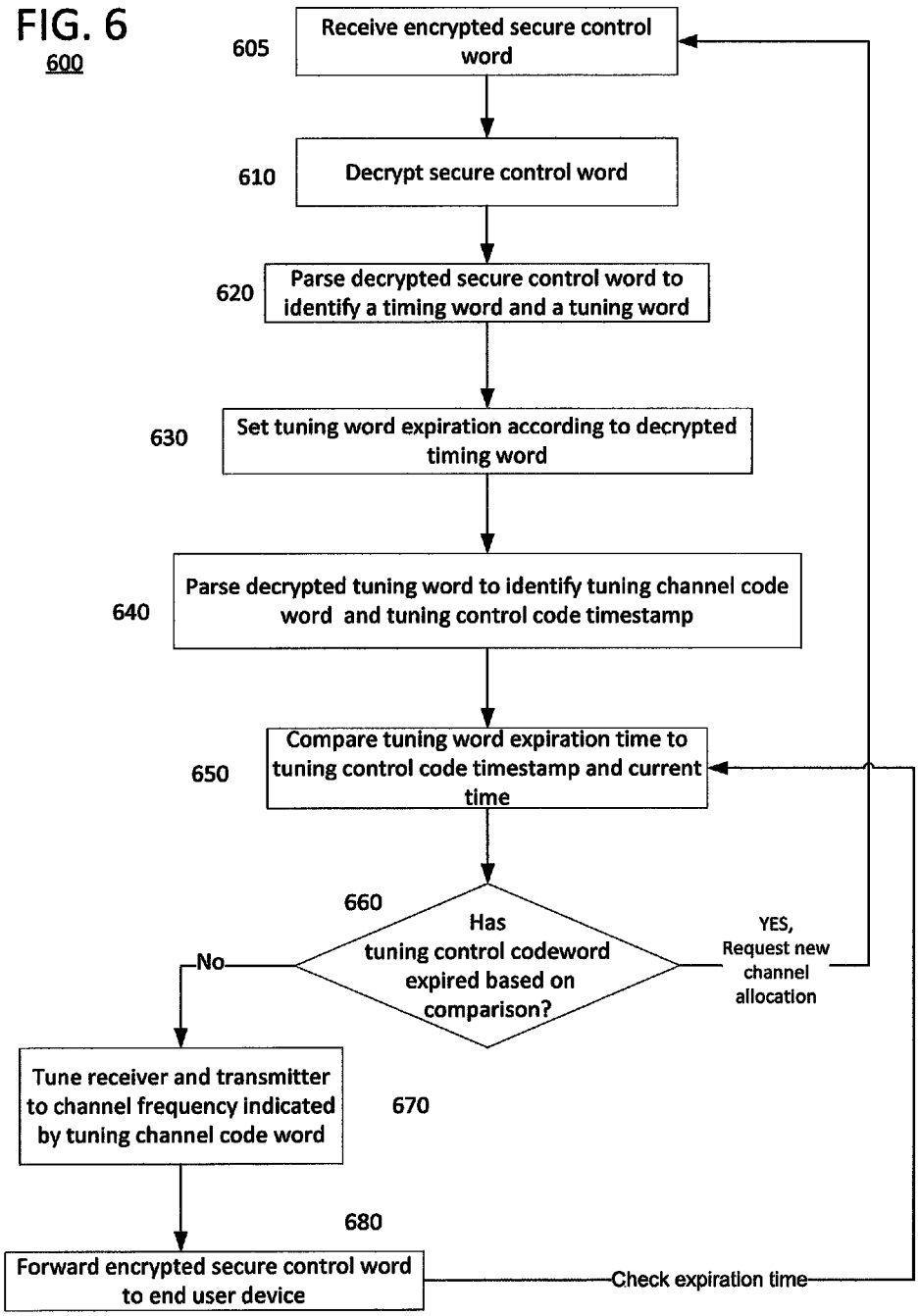

700

800A

800B

TUNE CONTROL FOR SHARED ACCESS SYSTEM

BACKGROUND

In recent years, radio frequency spectrum has become available for use by the general public that was typically reserved for exclusive use by government entities or large entities. Typically, when radio frequency spectrum is made available, the Government licenses segments or bands of spectrum in various areas of a country for particular users. This method of purchasing licenses to radio frequency is similar to purchasing specific seats at baseball game, the tickets of the seats behind home plate are specifically sold by the row and seat number. In the past, spectrum was offered to enterprises in sets of specific frequencies in the available spectrum, such as, for example, 20 MHz, –22 MHz, 22.001 MHz-24 MHz, and so on.

However, a present proposal would authorize a single channel (or set of channels) within an available range of frequency bands in a shared radio frequency spectrum model. In this shared radio frequency spectrum model, a single smaller channel (or set of channels) could be at any frequency within the recently made available larger frequency band. In other words, a license can be purchased for a 10 kHz channel in the frequency range of 20 MHz-22 MHz. Under the license, any device would be allowed to operate within the 20-22 MHz range, but only on an assigned 10 kHz channel within the range. This new licensing proposal is like a general seating arrangement in a baseball stadium, where an outfield general seating ticket is purchased and the ticket holder is seated anywhere the usher directs so long as it is in the outfield bleachers section of the baseball stadium, as opposed to a previously designated specific seat. In other words, the user does not choose a specific seat in a general seating arrangement.

A need exists, however, for a technique to protect the licensee's use of the band of frequency channels from interference or other adverse effects caused by others' unauthorized use of the various channels and to keep the authorized users on their assigned channels. The inventor has identified the need for an authorized shared access system that implements a secure method for reporting the access point identification (secure ID), for reporting a GPS derived location (secure location reporting), and for receiving a secure tuning control word (an encrypted synthesizer tuning command) to securely select a channel at the GAA AP or GAA EUD device.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6 is a flowchart of an example of a process implemented in an example of a secure synthesizer used with the described authorized shared access system.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The Federal Government has proposed making radio frequency spectrum (e.g. 100 MHz within the 3.5 GHz range) that is currently reserved for government and military uses to commercial vendors available for use on a shared basis. For example, the radio frequency spectrum that is to be shared by other users as well as the government users is in the frequency ranges typically used for military or air-traffic radars (air-borne and ship-borne), air-ground/ground-air communications, and other uses, which are often intermittent uses. None of the Federal Government uses are full time uses of radio frequencies within the radio frequency spectrum that is to be shared with commercial and unlicensed users. As a result, there are periods of time, which, depending upon location, may be of a long duration, in which a swath of radio frequency spectrum is unused. A purpose of the spectrum sharing is to allow non-Federal Government users to make use of this unused radio frequency spectrum until the Federal Government (i.e. higher priority) users need to use it. For example, users in a coastal region may use frequency spectrum typically reserved for US Navy radar systems until a US Navy ship enters the region and needs the to use the ship-borne radar in the reserved frequency spectrum.

Figure 1:
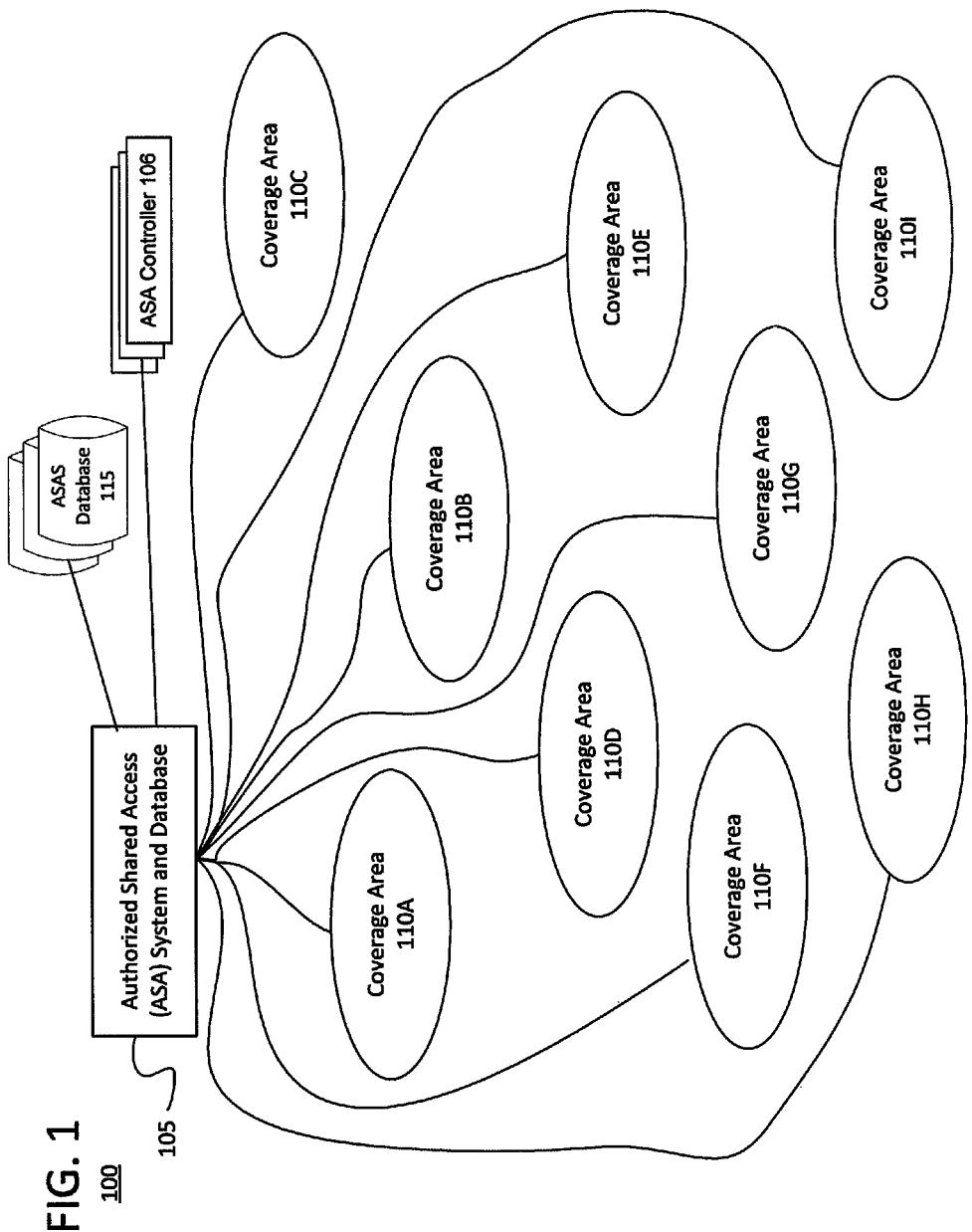
FIG. 1 is a conceptual diagram illustrating areas that would be provided with radio frequency coverage by an example of an authorized shared access system.

Due to the different levels of use of radio frequency spectrum in different areas of the United States, instead of large geographical regions, such as entire states, there may likely be pockets of coverage areas in which the radio frequency spectrum may be used. For example, as shown in FIG. 1, the shared radio frequency spectrum may be shared in one or more coverage areas 110A-I spread over a large geographical region under the control of an authorized shared access system and database (ASAS) 105. The ASAS 105 would allow the sharing of the radio frequency spectrum on a priority basis between three tiers of users in the different coverage areas 110A-I.

For example, the first tier (Tier 1) users, having the highest priority would the government and military incumbent operations. The next tier (Tier 2) would be Priority Access/Commercial Wireless Network Providers (e.g. Verizon®, AT&T® and the like), who would have mid-level priority. The third tier (Tier 3), with the lowest priority, would be for General Authorized Access (GAA) users. Tier 1 users are assumed to have full access whenever needed or desired. The ASAS 105 is the system that manages the allocation of the shared radio frequency spectrum to the various Tier 2 and Tier 3 users based on the use of the band by higher-priority Tier 1 users. The ASAS 105 may be a system of one or more controller(s) 106 and one or more database(s) 115, all of which may receive data from various Tier 1-3 users. The database 115 may be populated with data regarding the expected use of the shared radio frequency spectrum. For example, a shared access spectrum regulating body, such as a Federal Government agency, a quasi-government agency, or a private regulator, may receive input, such as scheduled or expected spectrum usage and locations of the scheduled or expected usage from the various Tier 1 and 2 users. This input may be received months, days, or hours ahead of time to allow efficient management of the shared access spectrum. The one or more controllers 106 communicate with the database 115 to determine the availability of spectrum to be shared and the locations in which the spectrum may be shared. Based on this information, the ASAS 105 can make determinations of the channels used, coverage areas 110A-I size and durations.

The coverage areas 110A-I may be larger in more rural areas (e.g. measured in square miles) and smaller in urban settings (e.g. measured in square city block(s)). In addition, the coverage areas 110A-I in FIG. 1 are areas in which the radio frequency spectrum to be shared is used by the Tier 1 and Tier 2 users without interference. For example, the database may indicate that the Tier 1 and Tier 2 users in Dickinson County, Iowa, USA are not using frequencies in the shared radio frequency spectrum for several days. An ASAS controller 106 of the ASAS 105 upon receiving a request from a Tier 3 device in the vicinity of Dickinson County for access to an available frequency in the shared radio frequency spectrum may determine if any of the shared radio frequency spectrum is available to be shared. Using information obtained from a database 115 regarding the Tier 1 and Tier 2 users, the ASAS controller 106 identifies an available channel within the frequency band for use by Tier 3 users in a coverage area that includes the requesting device in the vicinity of Dickinson County, Iowa. The ASAS controller 106 of the ASAS 105 provides an encrypted, secure code word indication of the identified channel and an expiration time of the requesting Tier 3 devices granting access to the identified channel. An expiration time is included, for example, because the database may indicate, after some time, that a Tier 1/2 user may need access to the identified channel in Dickinson County, Iowa. In which case, the requesting Tier 3 device may be moved to another available channel, or completely disconnected, in favor of the Tier 1/2 user.

Figure 2:
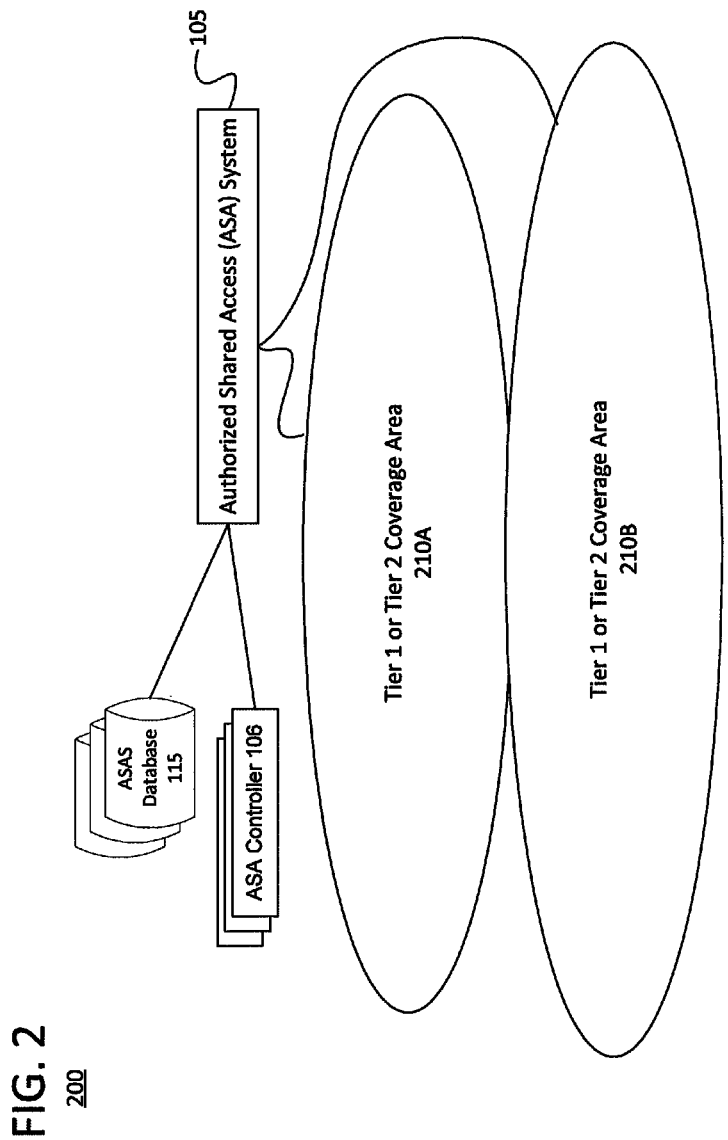
FIG. 2 is a conceptual diagram illustrating an example of areas that would be provided with radio frequency coverage for higher priority users in the authorized shared access system.

As shown in FIG. 2, the ASAS 105 may control, via one or more ASAS database(s) 115 and one or more ASA controller(s) 106, the determination and management of the channels within the shared radio frequency spectrum and within the coverage areas 210A-B. In this example, the radio frequency channel is allocated to the Tier 1 (Government/military user) and, under a license, to a Tier 2 (commercial) user for non-interfering use (i.e. Tier 1 and Tier 2 users use the radio frequency spectrum without interfering with one another). The ASAS 105 is coupled to an ASA database 115 that stores data related to the use of the shared radio frequency spectrum by the higher tiered users and also the locations of lower tier users, who will be discussed in more detail in the following paragraph.

The ASAS 105 is configured to implement spectrum sharing paradigms that may allow a Third Tier (Tier 3-GAA, General Authorized Access) set of users to share a frequency band by having timed access or managed access to allocated radio frequency channels along with Tier 1 (government and military incumbent operations) and Tier 2 (Priority Access/Commercial Wireless Network Providers) without interfering with the Tier 1 and Tier 2 users. The Tier 3 users may be unlicensed, which means that any Tier 3 user may use the available spectrum without guaranteed further protection from interference from other GAA users. Examples of GAA users may be a retail store, a local delivery truck service, hand-held radio service, a rural town or rural county non-essential governmental service entities (e.g. animal control, social services, and the like), small businesses, colleges, universities, individuals or others that need or want only intermittent connectivity to a data communication network. The types of data that can be transmitted over the data communication network include document data (e.g., document files, spreadsheets and the like), audio data, multimedia data, image data, sensor data (e.g., water levels, electricity usage, roadway conditions, and the like), video data, voice data and the like. In addition, control signaling data (e.g. data for establishing communication sessions, providing connected device status information and the like) may be exchanged between the ASAS system 105 and any of the GAA user devices using the shared spectrum.

Figure 3:
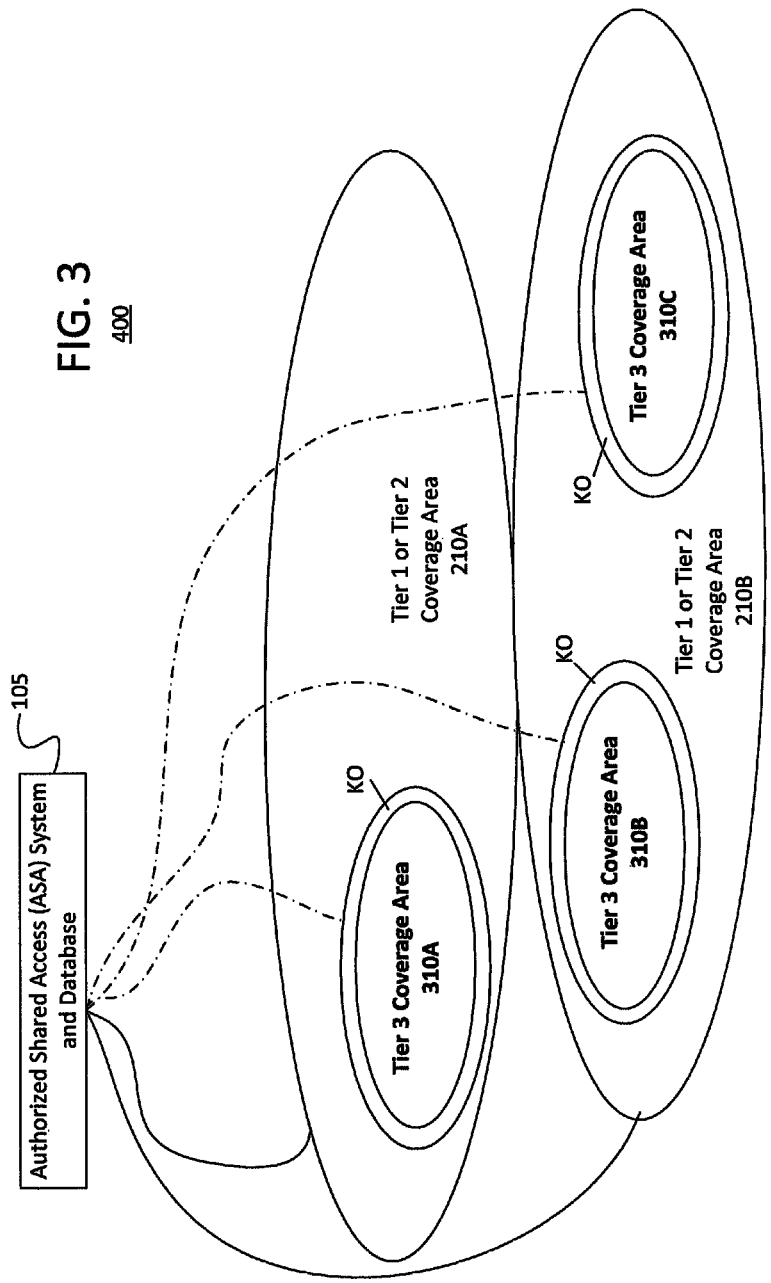
FIG. 3 is a conceptual diagram illustrating an example of areas that would be provided with radio frequency coverage for lower priority users within coverage areas of higher priority users in the authorized shared access system.

Geographical areas within the radio frequency coverage regions allocated for use by the Tier 1 and Tier 2 users may have smaller coverage areas carved out for use by Tier 3 users, such that the Tier 3 users will not interfere with use of the spectrum by the Tier 1 and Tier 2 users in the remaining area of the coverage area. For example, as shown in FIG. 3, under control and management (described in more detail later) of the ASAS 105, the shared radio frequency spectrum channels allocated to the Tier 1 or, under license, to Tier 2 users in certain coverage areas, such as 210A and 210B, may have smaller coverage areas, such as 310A-C, within respective coverage areas 210A and 210B in which specific radio frequency channel(s) is (are) temporarily turned over to Tier 3 users for non-interfering use. For example, the ASAS database 115 maintains and stores updates of shared radio frequency spectrum channel allocations, Tier 1/2/3 device locations and activity as well as potential future activity. The methodology used by the ASAS 105 to determine the smaller coverage areas 310A-C will be described in more detail below.

The ASAS system 105 may have stored in the ASAS database 115 information related to when the Tier 1 and Tier 2 users are scheduled to use frequency channels (which may be all available channels) of the shared radio frequency spectrum in a particular location. Based on this data in the ASAS database, the ASA controller 106 may assign respective areas, e.g. coverage areas 210A and 210B as shown in FIG. 2. Under control of the ASAS system 105, the shared radio frequency spectrum may be shared in respective coverage areas in a more efficient, and non-interfering manner.

In the spectrum sharing paradigms that may be implemented, the unlicensed Tier 3 users may have the following impact. Firstly, the unlicensed Tier 3 access points (APs) and end user devices (EUDs) will likely operate at low power commensurate with FCC regulation part 15 related to unlicensed device power levels. Secondly, the Tier 3 APs and EUDs are not under the direct control of a wireless service provider network (WSPN). Examples of WSPN include cellular carriers that provide global system for mobile communication (GSM) systems, code division multiple access (CDMA) systems, universal mobile telecommunications systems (UMTS), or long term evolution (LTE) systems for data and voice communications. A WSPN wireless air interface (WAI) typically has a separate control layer that controls authentication of handsets, billing and identification information, air interface resource control (channel allocation), and management of the interface to the wireless network, and a separate data layer that handles the exchange of data between devices. However, unlike GSM, CDMA, UMTS, and LTE WSPN systems, the Tier 3 users would be under a different WAI that may not have a control layer and a data layer similar to the WSPN layers. Instead, a Tier 3 AP or EUD would be more similar to a Wi-Fi air interface, where there is neither a centralized wireless network control plane nor an organized wireless network.

For Tier 3 devices, this lack of a centralized WSPN control plan raises a number of issues in the context of sharing spectrum between Tier 1, 2 and 3 users. For example, sharing may require the use of an Authorized Shared Access System (ASAS) controller and database system 105 to properly allocate spectrum regions, in order to share the resources among different tiers of users, and also, more importantly, to avoid co-channel interference. The ASAS system 105 with reference to the ASAS database may allocate frequency channels of shared spectrum based upon the requests for allocation (time, amount of spectrum desired, and, most critically, the location). Location is important to assure that the channel allocation does not interfere with any higher priority users operating in the vicinity of the location. Based upon location, the ASAS system 105 may use a propagation model to determine how large any keep-out zones (see KO areas of FIG. 3) would need to be around the co-channel Tier 1 and Tier 2 users to protect the higher priority users from Tier 3 interference. Outside this keep-out zone radius, the same channel allocation could be reused (frequency reuse) by other users in any of the Tiers 1-3.

The ASAS system 105 when determining keep-out (KO) zones could use either a database approach or a spectrum sensing approach. In the database approach, the ASAS system 105 database may include Tier 1, Tier 2 and Tier 3 device locations, respective device parameters, such as signal power levels, assigned channels, and the like, and apply signal propagation models based on known or expected power output levels of the respective devices in a proposed coverage area to determine whether a requesting Tier 3 device can be granted access to available spectrum and also the extent of the coverage area provided for the requesting Tier 3 device. Based on the results of the determination, the ASAS 105 controller may grant or deny access to the channels by the requesting Tier 3 device. In the spectrum sensing approach, the Tier 3 APs and/or Tier 3 EUDs could use scanning receivers to measure the channels of interest and report back to the ASAS 105 controller measurements that indicated whether or not interference from other co-channel users was detected at their present location. Also, a hybrid approach could be employed, where both the database (using a propagation model calculation) along with spectrum sensing reports from the Tier 3 AP/EUDs are used in combination to determine the keep-out zones for the respective coverage areas 310A-C. For example, the KO zone for coverage areas 310A may be different from the KO zone for coverage areas 310B and 310C. The size of the KO zone may be determined by the ASAS 105 based on the above-mentioned database propagation models, spectrum use measuring or the hybrid approach. Database and propagation calculation methods have the advantage of simpler methods and algorithms based purely on location information, but precise prediction of RF propagation is notoriously inaccurate. It can be quite complex to have all the data (local terrain data, building locations, locations of trees, dielectric and conductivity constants, etc,) in order to accurately calculate local propagation. On the other hand, spectrum sensing requires additional hardware capabilities at the various radio stations and also a set of standardized communications interfaces (across dissimilar air interfaces and hardwares) to allow the ASA system to request measurements, receive the measurement reports, and properly store and map the results. These measured results are more accurate in that they include all local effects, such as the presence of buildings, whether local foliage has leaves, etc, and therefore includes all the real world effects, regardless of whether they are included in a theoretical propagation model. Once the database propagation models or the spectrum sensing indicates unoccupied spectrum, that channel or set of channels could be allocated for serving the requesting Tier 3 GAA user.

Figure 4:
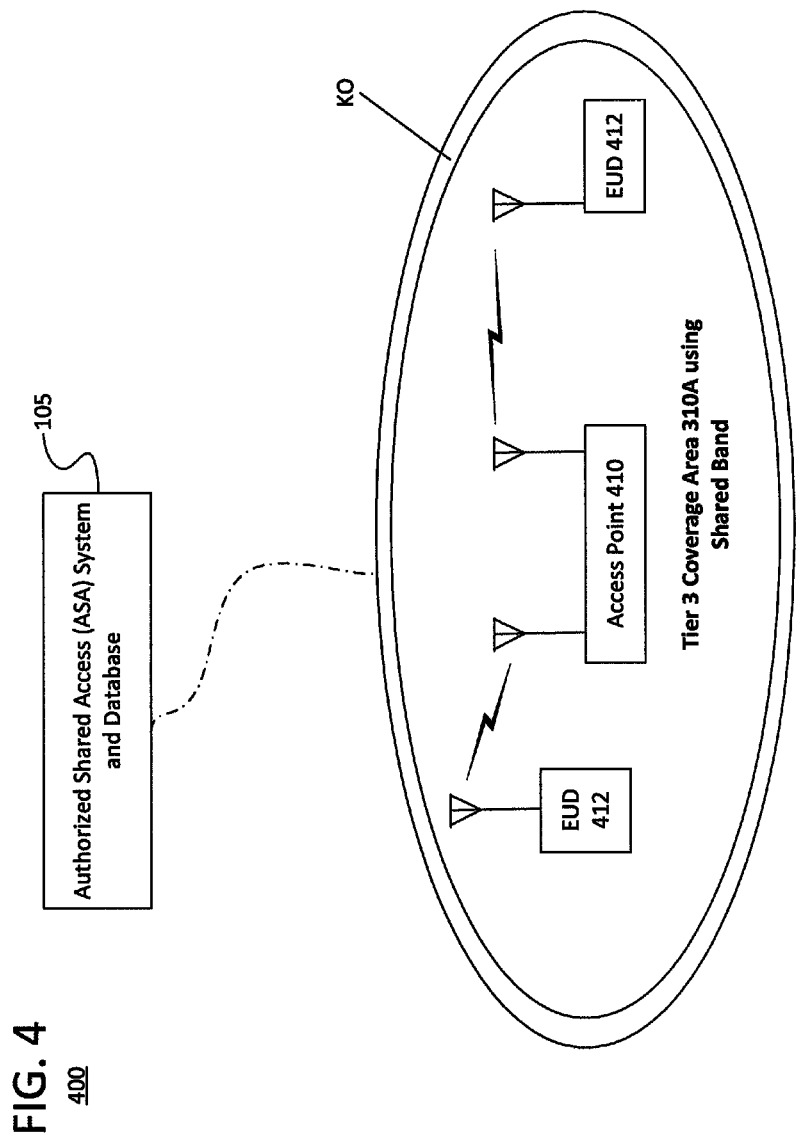
FIG. 4 is a conceptual diagram illustrating a coverage area in which is shown an example of a GAA access point and a GAA end user device implementation that would provide shared radio frequency spectrum coverage for lower priority users in an authorized shared access system.

An example of an access point and an end user device implementation that would provide shared radio frequency spectrum coverage for lower priority users in an authorized shared access system is shown in FIG. 4. Generally, the ASAS 105 has determined that a Tier 3 coverage area 310A is available for non-interfering use of the shared radio frequency spectrum based on various parameters of the Tier 1, Tier 2 and requesting Tier 3 devices. The requesting access point (AP) 410 is allocated an available channel (a channel or channel set that is within the frequency band in which the AP 410 is to operate), and begins operating on the indicated channel. Also, the AP 410 is configured to forward the indicated channel as well as other parameters, such as maximum signal power levels and the like, to the AP's associated end user (EU) devices 412, which can begin communicating with the access point 410 on the allocated channel. In addition, the ASAS 105 may determine a KO zone relative to the coverage areas 310A where this specific, allocated channel will not be allocated for use by any other users. The operation of the access point 410 and end user devices 412 will be described in more detail below.

In order to protect Tier 1 and Tier 2 users in a shared spectrum system from rogue behavior on the part of Tier 3 GAA users and devices (APs 410 and EUDs 412), three mechanisms are secured. First, the identity of the Tier 3 user making the request for a spectrum allocation is securely known. Therefore, the user identification protocols are encrypted, such that the ASAS cannot be spoofed by a Tier 3 device faking another identity. Second, the Tier 3 AP reports its valid location for interference determination (e.g., keep out radius). For example, the protocol should mitigate against a problem such as when the AP is actually in New Jersey, but provides a location in Alaska, so the ASA controller may give access to channel XYZ, which may be properly available for use in Alaska, but that is already in use in New Jersey. As a result, the spoofing New Jersey based AP is mistakenly allocated a channel that is clear for non-interfering use in Alaska, but heavily used in New Jersey. In which case, the rogue New Jersey device interferes with other users in Tier 1/2/3. That location report to the ASAS is based upon an internal GPS within the AP, so the AP can accurately determine and report its own location. That location report to the ASAS controller is secure, so the report is encrypted, again to avoid the possibility of spoofing the ASAS 105 as far as location reporting is concerned. In an example, encryption takes place within a secure ASIC implementation within the GPS reporting system, and not under the control of firmware or software executing on the local microprocessor within the AP device. And, thirdly, the Tier 3 AP and EUD devices are not able to autonomously tune their own RF synthesizers for channel tuning.

Figure 5A:
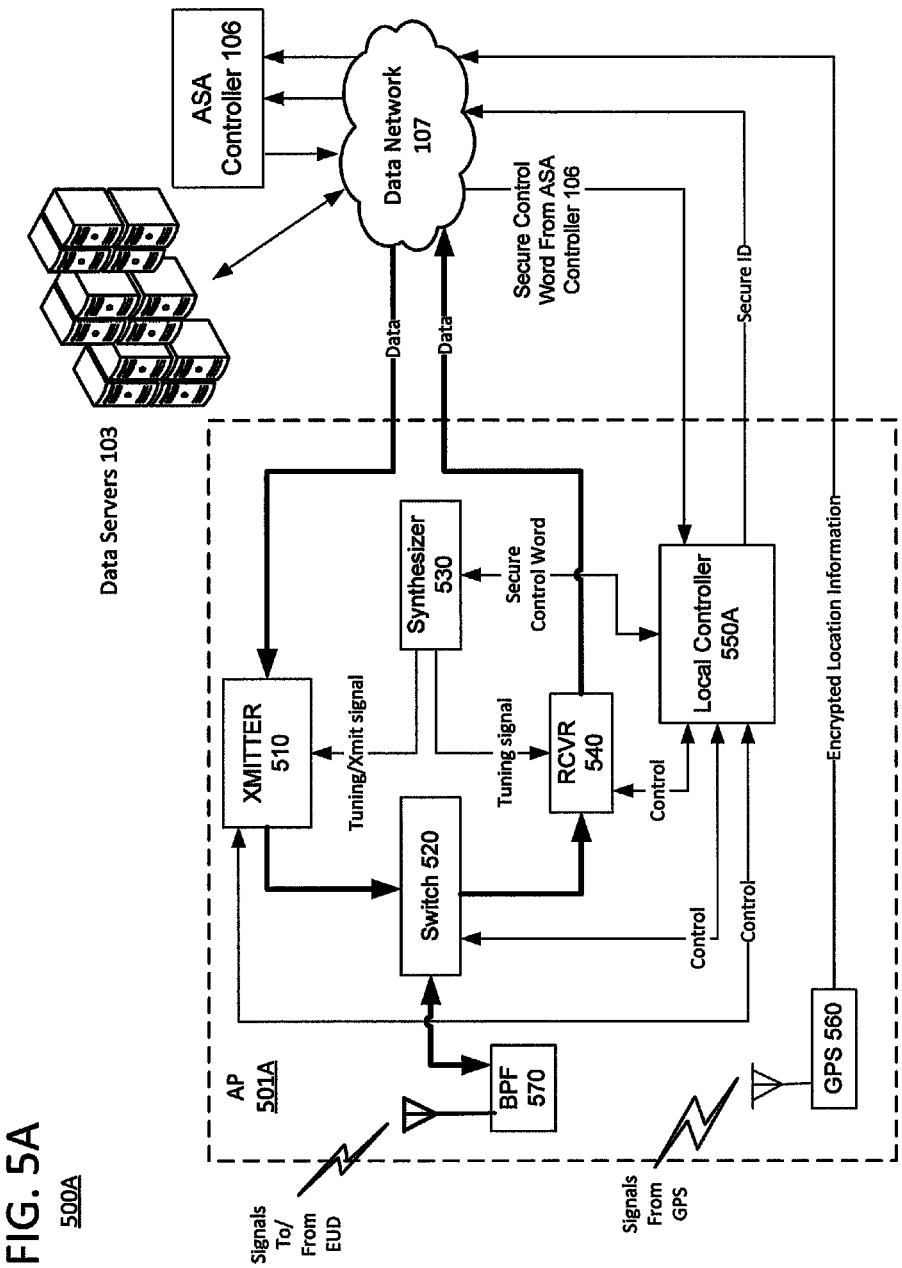
FIG. 5A is a high-level functional block diagram showing an example of an access point implemented in a time division duplex (TDD) configuration for providing access to shared radio frequency spectrum as well as showing a network, controller and servers in communication with the access point.

FIG. 5A is a high-level functional block diagram of an example of a system including an access point implemented in a time division duplex (TDD) configuration for providing access to shared radio frequency spectrum for end user devices. The system 500 may include an AP device 501A, a data network 107, an authorized shared access (ASA) controller 106 and data servers 103. The data servers 103 provide data and other services to devices (e.g. AP 501 and EUD) and systems that access the data network 107. Also, connected to data network 107 is the ASA controller 106, which is part of the ASAS 105 described above with respect to FIGS. 1-4. The ASA controller 106 has access to the database and other resources of the ASAS 105 (e.g. implemented on a database server(s) 104 in this example). The ASA controller 106 may determine the frequency band that will be allocated to the requesting AP 501A from the available frequency bands in the shared radio frequency spectrum. In addition, the ASA controller 106 may determine the extent, if any, keep-out zones and the transmit power settings of the AP 501A and any connected EUD. The ASA controller 106 is able to communicate with the AP 501A through the data network 107 via a communication channel (e.g., Wi-Fi, fiber optic, coaxial cable and the like) that is different from the shared frequency spectrum.

Figure 5B:
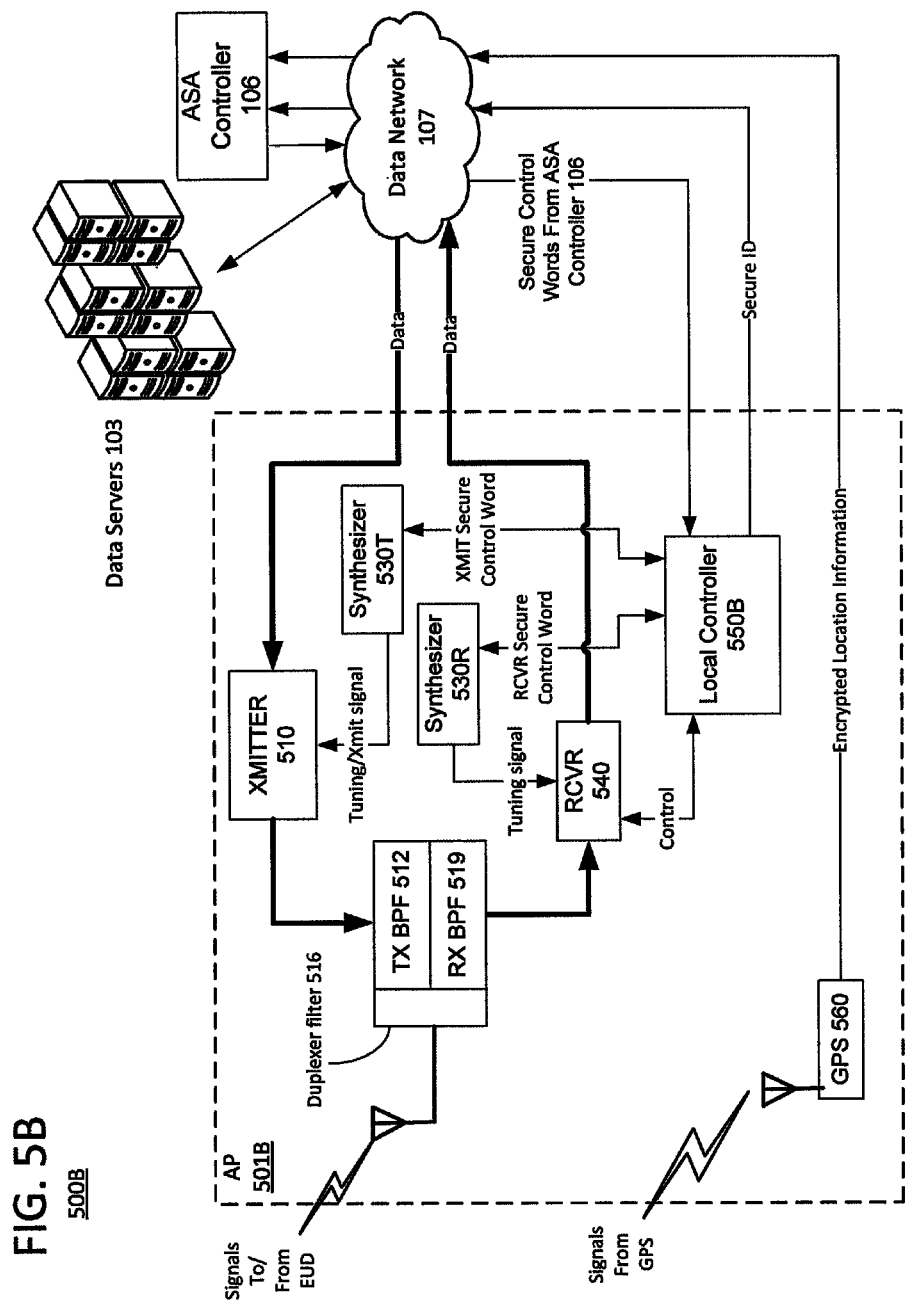
FIG. 5B is a high-level functional block diagram showing an example of an access point implemented in a frequency division duplex (FDD) for providing access to shared radio frequency spectrum as well as showing a network, controller and servers in communication with the access point.

The TDD AP 501A includes a transmitter (XMITTER) 510, a duplex switch 520, a synthesizer 530, a receiver (RCVR) 540, a local controller 550A, a GPS receiver/reporter 560, and a band pass filter 570. Under control of the local controller 550A, the AP 501A performs routing functions typical of, for example, a Wi-Fi router or other type of signal router, but only in the channel allocated by the ASA controller 106. Similar functionality is also envisioned for access points or end user devices that are implemented in frequency division duplex (FDD) systems, which will be discussed in more detail with reference to FIG. 5B.

The AP 501A is an access point for connecting EUD (not shown) to the data network 107 and the data servers 103. The AP 501A and any of its served EUDs (which communicate with the data network via to the AP 501A within the Tier 3 coverage area) communicate in the channel (or channel set) allocated by the ASA controller 106. The AP 501A may connect to an external network, such as the data network 107, via a connection through an interface that is wired or wireless. If on a wireless interface, the connection is via a frequency spectrum band separate from the frequency band or channel used by the wireless AP 501A to connect to an end user device or the like. The data network 107 may be any form of data network, such as the Internet, an intranet, a campus-wide LAN, metropolitan LAN or other form of data network that allows an external managing controller, such as ASA controller 105, to communicate with the AP 501A. Data signals, shown by the heavier lines labeled "Data," are delivered from the data network via data connections (not shown) to the AP 501A. The data from the data servers 103 and may be provided through the data network 107 to the AP 501A via a wired (e.g. coaxial cable, fiber optic cable or otherwise hardwired connection) or wirelessly, via a cellular connection, Wi-Fi, Bluetooth or some other wireless format in a frequency range outside the shared radio frequency spectrum. The AP 501A, in an example of time division duplex (TDD) communications, simply passes data, via the transmission path that includes the transmitter 510, the switch 520, and the band pass filter (BPF) 570, and an airlink (not shown), to an EUD that has requested the data. The AP 501A is also configured, in a TDD implementation, to receive data from EUD user devices on the same channel that the AP 501A uses to transmit. The AP 501A receive channel includes the airlink to the AP device antenna, which is coupled to the BPF 570, the BPF 570, the switch 520 (configured to a receive state), receiver 540, and the AP data output connections to the data network and data servers 103.

The local controller 550A of AP 501A also distributes control signals within the AP 501A based on signals received from the ASA controller 106. The ASA controller 106 is coupled to the data network 107, and transmits and receives control signals to/from multiple APs, such as AP 501A, connected to the data network 107, or other networks (not shown) that connect to the data network 107. The AP 501A through connections to the data network 107, such as, for example, via a control connection with the external network, such as data network 107, is configured to receive control signals from the ASA controller 106. The control signals from the ASA controller 106 are received by the local controller 550A and are either processed, or, in the case of the encrypted, secure control word, simply passed through to the secure synthesizer 530. Control signals that are processed by the local controller 550A may be status signals related to the status of the transmitter 510, switch 520 and the receiver 540, or requests for retransmission of the AP 501A secure ID, and the like.

The secure synthesizer 530 is implemented, in some examples, as a dedicated secure ASIC and includes a processor (not shown) and a memory (not shown). The synthesizer 530 has control signal connections to the local controller 550A for receiving the encrypted secure control word, to the transmitter 510 for providing a tuning signal for transmitting data in the transmit frequency band indicated in the encrypted secure control word, and to the receiver 540 for providing a tuning signal for receiving data signals in the receive frequency band indicated in the encrypted secure control word. Because of the possibility of interfering with the Tier 1 and Tier 2 users within the shared radio frequency spectrum, the secure synthesizer 530 is be implemented in a secure configuration in which the ASIC hardware or microprocessor firmware (or software stored in memory) cannot be re-written (i.e. re-flashed) to alter the behavior of the secure synthesizer 530 processor. In an example, only one type of secure synthesizer 530 is used in all access point devices, including AP 501A, and includes program instructions for a secure synthesizer 530 ASIC or processor to execute a tuning encryption/decryption method that is used so that the ASA controller 106 need only apply one set of coded (encryption/decryption) methods to all intended individual Tier 3 user APs. The interface between the secure synthesizer 530 and the local controller 550A may be via an inter-integrated circuit (I2C), a universal asynchronous receiver/transmitter (UART), and universal serial bus (USB), or the like.

In this example, the secure synthesizer 530 processor executes program instructions retrieved from a memory accessible only by the secure synthesizer 530 processor to decrypt the encrypted, secure control word provided by the local controller 550. Using the decrypted secure control word, the secure synthesizer 530 itself tunes the transmitter 510 and the receiver 540 to a channel indicated by the decrypted secure control word, which was provided as an encrypted secure control word by the ASA controller 106.

When the ASA controller 106 is determining the channel allocation, the transmission permission parameters and other parameters (e.g. transmit power levels) for each of the respective APs, such as AP 501A, the ASA controller 106 consults the database of the ASAS 105 to determine the availability of channels and the locations of higher priority Tier 1 and Tier 2 users. For example, the ASA controller 106 uses AP location information to check for possible interference conditions to/from higher priority users (e.g. the Tier 1 or Tier 2 users) based upon the KO zone area (See FIGS. 3 and 4) determined using different techniques, (such as the signal propagation model, an interference model, spectrum monitoring data provided in some examples, or a hybrid technique that uses a combination of both) and information in the ASAS 105 database. As a result, the location of the AP 501A in a respective coverage area, such as coverage area 310A, is one parameter for appropriate allocation of the frequency channels in the shared radio frequency spectrum. Other parameters may include signal power levels of other Tier 1/2/3 devices in the vicinity of an AP requesting access to available shared radio frequency spectrum.

The location determining and reporting functions of the AP 501A are performed by the GPS receiver/reporter 560. Location information of the local EUD served by the AP are assumed to be 'local' to the serving station (either the serving Access Point or the serving Small Cell).

The GPS receiver/reporter 560 is a secure AP 501A component that communicates with the ASA controller 106 in a dedicated GPS communication pathway separate and secure from the communication pathway(s) established between the local controller 550A and ASA controller 106. In other words, the GPS receiver/reporter 560 is a position (i.e. location) determination component of the AP 501. The GPS receiver/reporter 560 automatically determines location (i.e. position) information for the AP 501A, and reports (i.e. conveys) the location information to the ASA controller 106 via the separate and secure communication paths. For example, the GPS location information report related to the AP 501A is generated within a secure application-specific integrated circuit (ASIC) (with encryption all the way to the ASA controller 106). The GPS receiver/reporter 560 is configured with encryption circuitry as well as a GPS receiver and a transmitter (i.e. reporter).

In another example, the GPS reporter 560 is not implemented on a conventional controller microprocessor controlled by a firmware (or software) image, because firmware or software can be re-written (reflashed) to alter the behavior of the devices' controllers (i.e. to prevent 'hacking' or 'cracking' of the hardware device in the GPS receiver/reporter 560). The determination of the AP 501A location or the subsequent encryption of the location is not performed by a microprocessor controller (within the GPS receiver/reporter 560) under software or firmware control to minimize the risk of re-flashing to crack control and allow false location reporting. A GPS chipset (not shown), which may include a processor, GPS antenna, and other circuits, within the GPS receiver/reporter 560 provides the functions of measuring satellite signals and location determination. Additional circuitry, such as digital logic circuits, is configured to provide encryption of the location determination by the GPS chipset, to generate an encrypted GPS report (secure encryption method), and transmit (i.e. convey) the encrypted GPS report to the ASA controller 106. The encrypted GPS report remains encrypted until received by the ASA controller 106. For example, only the ASA controller 106 has the capability (e.g. private decryption key) to decrypt the transmitted, encrypted GPS report. By transmitting the GPS report in an encrypted manner separate from the local controller's 550 formatting and control, and directly (i.e. without being decrypted by any intermediary device or process prior to delivery to the ASA controller 106) to the ASA controller 106, the local controller 550A of the AP 501A cannot alter the encrypted GPS report, or be used to spoof the determined location (report a false location) of the AP 501A. This avoids circumventing the ASAS 105 channel allocation of the available channels from the shared radio frequency based upon the real location of the AP 501A. As a result, in an example, the AP 501A does not include an input for a GAA user to enter initial location information. Instead, the system relies on secure reports from the GPS receiver/reporter 560. Also, the GPS receiver/reporter 560 may provide location reports to the ASA controller 106 at different times. For example, the GPS receiver/reporter 560 transmits location reports of the AP 501A, after the occurrence of an event, such as a request to download content that will consume bandwidth, shutdown of the AP 501A local controller 550A, just prior to start up, or similar events; or upon specific request by the ASA controller 106. In some examples, the GPS receiver/reporter 560 provides location report updates to the ASA controller 106 over time, which may or may not be periodically. In this manner, if the AP 501A unit is moved, the ASA controller 106 will automatically know the new location via the secure GPS report from the GPS receiver/reporter 560 without user intervention.

Operation of the AP 501A will now be discussed in more detail. Prior to the AP 501A establishing or maintaining a communication session with a served EUD (not shown), in response to a request from an EUD for data services received via the receiver RCVR 540, the AP 501A local controller 550 generates an access request that includes a secure identification (ID) of the AP 501A, and that is transmitted to the ASA controller 106 in a communication channel, different from the communication (i.e., frequency) channel used by the AP 501A to communicate with a EUD, established through the data network 107 with the ASA controller 106. The secure ID is an identifier that uniquely and securely identifies the AP 501A to the ASA controller 106. The ASA controller 106 may authenticate the AP 501A by accessing a database (not shown) of the ASAS 105 (also not shown).

In an example, the ASA controller 106 is configured to, in response to the request from the AP 501A, determine a free channel, make the channel allocation, and provide a secure tuning control word via a communication path through the data network 107 to the AP 501A. The secure control word is used to ensure that the Tier 3 devices (e.g. GAA AP 501A and any EUDs connected to the AP 501A) are under the secure control of the ASA controller 106 and the ASAS 105 for both transmit permission and channel selection (i.e. synthesizer tuning). The secure control word, when locally (i.e. at the AP 501A) decrypted, indicates a channel in a frequency band of the shared access radio frequency spectrum on which the AP 501A is allocated to communicate, and provides an indication of when it is permissible for the AP 501A to transmit to the EUD. The communication channel allocation, for example, expires after a limited amount to time to prevent unauthorized future use. The transmit permission may be a time period in which transmission by the AP 501A or EUD will not interfere with other higher priority users or, simply to establish a communication protocol with the EUD and the ASA controller 106. The encrypted secure control word may also include additional parameters such as a transmit power level of the AP 501A and any EUD that connects to the AP 501A.

At this point, a brief discussion of a format of a secure control word, or tuning token, may be appropriate. A secure control word may include a secure socket layer (SSL) or transport layer security (TLS) header and an encrypted token. The SSL/TLS header may include an IP header, SSL/TLS parameters and an optional hypertext transport protocol (HTTP) field. The SSL/TLS parameters provide for encryption of the data while in transmit from the ASA 106 controller to the AP 501A and/or an EUD, and provide a satisfactory level of insurance of data integrity and confidentiality. Using the SSL/TLS parameters, the AP 501A or EUD processor may perform mandatory server authentication using public key infrastructure (PKI) protocols and insure that the device delivering the secure control word has a properly built certificate chain, such as a X509v3 certificate, to validate. The key generation and exchange may be performed according to known methods that provide a suitable level of security and data integrity to prevent unauthorized decryption of the secure control word. Of course, non-PKI methods may be used.

Any application data protocol (e.g., JASON or Binary file) may be used when transmitting the secure control word, HTTP is often preferred due to the prevalence of the web services infrastructure. As for the encrypted token portion, the encryption used may be a symmetric encryption such as advanced encryption standard (AES) or triple data encryption standard (3DES). The encrypted token portion may include a number of data fields, such as a metadata field, a frequency field, a random number and signature field and a message authentication code (MAC) field. Each field may include encrypted data relevant to tuning the AP secure synthesizer 530 to a suitable frequency. For example, the metadata field may include information such as a secure control word expiration date, a time and date and the relevant client and server identifiers (e.g., session identifiers, geo-location data and the like). The frequency field may include the frequency to which the synthesizer (and accordingly the transmitter and receiver) are to be tuned. The random number and signature field may include a random number generated from a secret encryption key (introduce entropy) that may be signed with a private key for authentication. The MAC field may be used for confirming the secure control word payload by using, for example, a hash-based message authentication algorithm or other suitable algorithm.

In an example of the secure control word workflow at the AP 501A, the local controller 550 provides the IP address of the ASA controller 106 to the secure synthesizer 530 processor, and an SSL/TLS tunnel is established between the secure synthesizer 530 processor and the ASA controller 106 via the local controller 550. The local controller 550 may be configured to handle all network operations of the secure synthesizer 530, so complexity of the secure synthesizer 530 processor may be reduced. The ASA controller 106 delivers a status message to the secure synthesizer 530 processor. In return, the secure synthesizer 530 processor requests a frequency channel allocation from the ASA controller 106. The ASA controller 106 delivers the secure control word to the secure synthesizer 530 processor. The secure synthesizer 530 processor processes the secure control word by obtaining (e.g., parsing or otherwise extracting) the frequency information from the respective data fields (as described above) of the secure control word. The secure synthesizer 530 processor may or may not return an acknowledgement message to the ASA controller 106. The ASA controller 106 either in response to the acknowledgement message or, after a certain time period, may signal to the local controller 550 that the session is terminated.

The encrypted secure control word is transmitted via a communication connection, such as a connection to the Internet that supports Internet Protocol based communications, from the ASA controller 106 to an input of the Tier 3 AP 501A and to the AP secure synthesizer 530. The AP secure synthesizer 530 is the only component in the AP 501A that is capable of decrypting the secure control word. In other words, the encrypted secure control word is delivered to the secure synthesizer 530 in encrypted form, and at least in one embodiment has not been and cannot be unencrypted by any intermediary device between the secure synthesizer 530 of the AP 501A and the ASA controller 106. The secure synthesizer 530 tuning is kept under a purely hardware control mechanism, not under the control of local software or firmware resident in the local controller 550 microprocessor, to prevent, for example, the software or firmware from potentially being re-flashed, with the new, unauthorized software or firmware programming code that would allow the AP or EUD device to tune autonomously. This mitigates the threat of the AP device 501A from being "hacked" and prevents the resulting potentially interfering use of the AP device 501A or EUD device (not shown).

As an additional security measure, by allowing only the secure synthesizer 530 to decrypt the secure control word, the system 500 prevents other components, such as local controller 550, of the AP 501A (and subsequently the end user device (not shown)) from autonomously selecting their own transmit and receive channels and prevents the AP 501A local controller 550 microprocessor software or firmware control from autonomously instructing the secure synthesizer 530 tune to transmit and receive channels outside those allocated by the ASA controller 106.

In operation the system 500, the ASA controller 106 is configured to respond to requests for access to a channel of the shared radio frequency spectrum received from APs, such as AP 501A. The AP 501A may have an address (e.g. uniform resource locator (URL) or the like), which may be secure, of the ASA controller 106, or some other form of sending communication to the ASA controller through the data network 107. Alternatively, the ASA controller 106 may contact the AP 501A as well as other APs with a broadcast notification whenever candidate channels are available, or anticipated to be available. In which case, the local controller 550 of the AP 501A may generate a request for a channel from the shared radio frequency spectrum for communicating with an EUD. The AP 501A access request may include a secure ID that uniquely identifies the AP 501A. The secure ID may be a unique code provided to the AP 501A at the time of manufacture (e.g. coded into the local controller or secure synthesizer), provided by a user at time of registering the AP, if necessary, with the ASAS 105, or at time of purchase of the AP 501A.

In response to the request, the ASA controller 106 may access the ASAS database 115 to authenticate the AP 501A as an authorized device. The ASA controller 106 may cross-reference the AP 501A secure ID with a list of secure IDs stored in the ASAS database 115. In addition, as mentioned above, location information associated with the secure ID must be obtained from the requesting AP 501A device and the AP 501A GPS receiver/reporter 560, or from the ASAS database 115 (e.g. based on the last time a channel was allocated to the AP 501). The AP 501A secure ID may include a GPS receiver/reporter 560 secure ID or an address of the GPS reporter 560. The ASA controller 106, using GPS reporter 560 identifying information from the AP 501A access request or obtained from the ASAS database 115, may identify the GPS reporter 560 and obtain a reported location of the AP 501A. Upon authentication of the AP 501A as an authorized AP, the ASA controller 106 may access data indicating the availability of frequency channels (i.e. candidate channels) in the shared radio frequency spectrum for allocation to the AP 501A. The ASA controller 106 based on an analysis of the data (e.g. the location of the AP 501A, the scheduled use of frequency channels by higher priority users in the vicinity of the AP 501A location, and/or other factors, such as other Tier 3 users in the vicinity) in the database may determine a frequency channel allocation and an expiration time for the AP 501A access to the allocated channel. After the ASA controller 106 determines the frequency channel allocation and the expiration time, the ASA controller 106 generates an encrypted secure control word that is transmitted to AP 501A via the connection to the AP 501 through the data network 107.

The secure control word is received at the AP 501A by the local controller 550, but is passed uninspected to the secure synthesizer 530. Upon receipt of the secure control word, the secure synthesizer 530 may decrypt the secure control word and tune itself to the appropriate allocated channel(s) for reception and transmission.

Note that discussion of the FIGS. 1-8A primarily refers to time division duplex (TDD) communications, but the example devices (e.g. 501, 601 and 701) may be configured for frequency division duplexing (FDD) instead of or, in addition to TDD operation. A difference, as illustrated in FIG. 5B, being that the encrypted secure control word and respective tuning signals sent to the transmitter 510 and receiver 540 in the TTD examples indicate the same frequency, while in FDD the transmit frequency and the receive frequency (channels) are different, so the encrypted secure control word may be different to indicate the respective channel allocations for respective transmit and receive functions. As a result, in FDD, the tuning signals to the transmitter 510 and the receiver 540 will be different. The switch 520 and band pass filter 570 would be replaced by a duplex filter for FDD operation.

FIG. SB is a high-level functional block diagram showing an example of an access point implemented in a frequency division duplex (FDD) for providing access to shared radio frequency spectrum as well as a network, controller and servers in communication with the access point. The system 500B includes an FDD-configured AP 501B that interacts with the same external system components as AP 501A, which are the data servers 103, ASA controller 106 and network 107. As for the components of AP 501B, the GPS receiver/reporter 560, the transmitter 510 and the receiver 540 are configured the same in AP 501B as the same components in the AP 501A of FIG. 5A. However, instead of synthesizer 520, which provides a single tuning signal to both the transmitter 510 and receiver 540 as in FIG. 5A, the FDD-configured AP 501B uses a pair of synthesizers 530T and 530R.

In FDD systems, the transmitter 510 and receiver 540 functions may operate simultaneously or substantially simultaneously, and the duplexer or diplexer switch (e.g., 520 in FIG. 5A) is replaced by a duplexer filter 516 (also known as a diplexer filter). The duplexer filter 516 is connected to the antenna, and has two separate branches, one supported by a band pass filter (BPF) tuned to the transmitter band (i.e., TX BPF 512), and the second branch supported by a BPF tuned to the receiver band (i.e., RX BPF 519). The duplexer filter 516 is configured to allow the receiver to receive signals on the first communication (i.e., frequency) channel and to transmit signals on the second (paired) frequency channels. The secure control word in a FDD implementation may include at least a pair of secure controls words (e.g., one for transmitter tuning and another for receiver tuning) are provided by the ASA controller 106. Each of the individual secure control words in the pair of secure control words is different from the other secure control word in the pair, and will not be decrypted to produce the same frequency channel for tuning of the transmitter 510 and receiver 540.

While in an FDD implementation, different channels for transmitting and receiving will be allocated to the AP 501B and the synthesizer of AP 501A, such as synthesizer 530, is replaced by a pair of synthesizers 530T and 530R (if the uplink and downlink are uncoordinated), or, more likely, a fixed relationship (duplex spacing) between the uplink and downlink channel frequencies is employed, such that one indication indicates a pair of channel frequencies: one for uplink and one for downlink, a fixed separation in frequency apart. In the case of an FDD implementation, the secure control word will include a tuning word that indicates a pair of communication channel frequencies (e.g. two frequencies or two channel) assignments that will be parsed by the secure synthesizer processor.

FIG. 6 illustrates an example of the process 600 that the secure synthesizer 530, in a TDD implementation, performs in response to receipt of a secure control word from an ASA controller 106. A secure synthesizer, such as secure synthesizer 530, receives encrypted secure control words via a local controller, such as local controller 550 in the AP 501A (605). The secure synthesizer 530 processor executes encrypted instructions to decrypt the received, encrypted secure control word (610). As mentioned above, the encryption and decryption keys may be similar for all APs, so the processor may obtain decryption key(s) from a memory within the secure synthesizer circuitry. Alternatively, the secure synthesizer 530 may have decryption key(s) that are specific to the particular secure synthesizer 530. For example, a secure synthesizer 530 in another AP may have decryption keys different from the decryption keys of secure synthesizer 530 in AP 501A. The encryption technique, for example, used to encrypt the secure control word may be a public key encryption technique or other similar technique. In another example, the secure synthesizer 530 is implemented as an ASIC without firmware or software. In which case, the encryption/decryption logic is implemented in the circuitry of the ASIC.

In response to the decryption of the secure control word, the secure synthesizer 530 processor parses the decrypted secure control word to identify a timing word and a tuning word. In an example, the secure synthesizer may have a provision for any tuning word to expire, so that the secure synthesizer may not remain indefinitely locked onto one channel after original tuning. To facilitate the expiration of the tuning word, the timing word provides an indicator of a duration of a communication time interval. The communication time interval may be the time duration of the tuning word. For example, the timing word is a code word that indicates a specific expiration time and date (e,g. 130001012014— where the time is 1300 hours on Jan. 1, 2014), a time period from a predetermined date, where the predetermined date is the date on which the access point last received a secure control word, a set number of hours (e.g. 5), or some other indicator of an expiration time. The communication time interval may be provided by the ASA controller 106 based on the allocated communication channel to the AP 501A and other allocated communication channels to other APs. The ASA controller 106 forwards the provided communication time interval to the respective APs with the respective secure control words.

In an example, the secure synthesizer 530 includes a provision for all tuning words to expire, so that the secure synthesizer 530 tuner may not remain indefinitely locked onto one channel after original tuning for an extended period of time. At the expiration of, or close to, a tuning word, a new tuning instruction is provided by the ASA controller 106, or a new channel allocation request must be made by the secure synthesizer through the local controller 550 for a new secure control word. For example, the secure synthesizer 530 may be configured to not store old channel tunings or reuse previously provided secure control words. The decryption method is internal to the secure synthesizer 530, therefore, the secure synthesizer 530 may need timing information (input from an external source such as the data network 107 or the ASA controller 106 or the GPS receiver/reporter 560) to ensure expiration does occur and occurs at the correct time. Alternatively, the timing information may be maintained internal to the AP 501A by either the local controller 550 or the secure synthesizer 530 using or the GPS receiver/reporter 560, for example, an internal clock that may be calibrated using time information from an external source. The timing information (which may also supplied by the ASA controller 106 (i.e. external source) may also require encryption to prevent spoofing of the timing information, for example, to make old secure control words appear younger by altering the apparent date or time compared to the expiration date or time.

Returning to FIG. 6, at 620, the decrypted secure control word is parsed to identify a timing word and a tuning word. In addition to the timing and tuning words, expiration data (e.g. expiration time, time information related to the ASA controller 106, a clock setting parameter for setting a clock internal to the secure synthesizer 530 and the like) related to each of the timing and tuning words may be obtained from the secure control word. The tuning word parsed, at 620, from the encrypted secure control word may indicate a specific channel or specific frequency in the shared radio frequency spectrum frequency bands that is allocated by the ASA controller 106 to the AP 501A and any EUDs that will be communicating with the AP 501A.

Once the decrypted secure control word has been decrypted, the secure synthesizer 530 sets the tuning word expiration according to the decrypted timing word (630). The decrypted timing word may be stored in a memory of the secure synthesizer 530, while timing information previously stored in another portion of the secure synthesizer 530 memory.

At 640, the tuning word is further parsed by the secure synthesizer 530 processor to identify a tuning channel code word and a tuning control code timestamp.

One technique for maintaining security of the channel allocations and the encryption methods for generating secure control words is to continuously change the encryption at various times (e.g. rolling secure codes), and use new secure control words to indicate the change in channel allocation. The newly provided secure control word is a new encryption (e.g. new encryption/decryption keys are exchanged between the AP 501A and the ASA controller 106) and a new channel allocation, where the new channel allocation may or may not be the same as the previous channel allocation. This is performed, for example, based on the timing word.

For example, a secure control word may be decrypted to provide a tuning word indicating channel 4 has been allocated for tuning of the transmitter 510 and the receiver 540, and, according to the timing word, the channel allocation to channel 4 expires in 10 minutes from the expiration time of a previously-received secure control word. Within the 10 minute time window, the ASA controller 106 provides a next, or updated, secure control word that is passed to the secure synthesizer 530. The updated secure control word indicates a change of a channel (e.g. from channel 4 to channel 13). The updated secure control word is parsed to identify the respective tuning word and the timing word. The timing word may include an expiration time as well as a timestamp of when the updated secure control word was generated by the ASA controller 106. The next channel is channel 13 and the expiration time is 3 minutes from the expiration time of the previous secure control word (i.e. after the end of the 10 minute time window). The time may be maintained as continuous time such as 123456 in seconds, minutes or other units with a date indicator. For example, the 10 minute expiration time may be indicated in the timing word as 123466 or, if in seconds as 600 seconds, in which case, the timing word will indicate the expiration time as 124056 (i.e. 123456+600) with a data indicator of Ser. No. 12/312,015 (i.e. Dec. 31, 2015).

As a result of the rolling codes, there is not a one-to-one match between frequency tunings and tuning words that can be observed or deciphered by observing or storing old instructions and their resultant channel tunings. Together, the rolling code and encryption minimizes the probability of deciphering the encryption methods. So the secure tuning word has a tuning control code timestamp that causes the tuning channel code to expire by the next timeslot, and every secure tuning word appears new and unique.

In response to identifying the tuning channel code word and the tuning control code timestamp, the secure synthesizer processor 530 compares, at 650, the expiration time of the received tuning word to the tuning control code timestamp to determine if the received tuning code has expired. Based on the comparison, a determination is made, at 660, whether the tuning control code has expired. In response to a determination that the tuning control code has not expired (i.e. "No") at 660, the process 600 proceeds to 670 in which the secure synthesizer 530 processor tunes the transmitter and receiver to the frequency channel indicated by the tuning channel code word. In addition, the expiration time based on the next tuning word expiration time is set. Also, the process 600 proceeds to 680 in which the encrypted secure control word used for the channel tuning in step 670 is further transmitted to the end user device(s) so any end user device(s) connected to the access point may tune to the allocated channel.

Figure 8A:
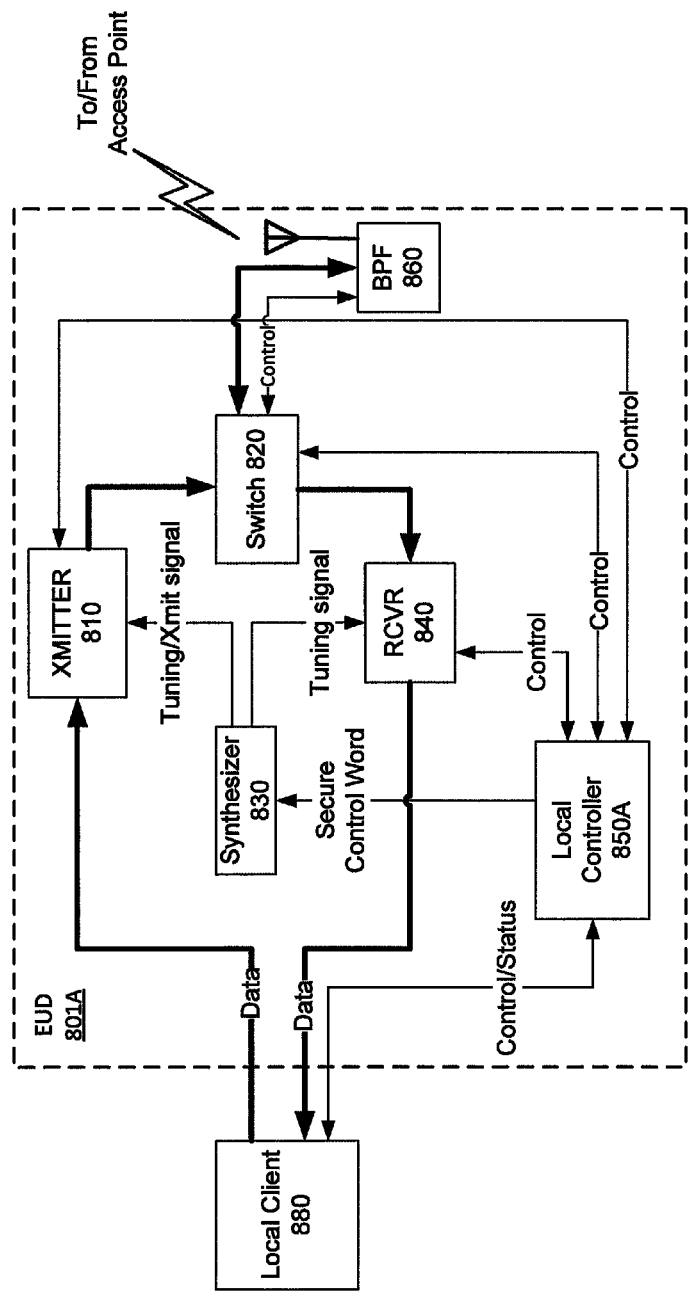
FIG. 8A is a high-level functional block diagram of an example of an end user device implemented in a time division duplex (TDD) configuration for providing access to shared radio frequency spectrum.

In this example, the end user device configured to operate as a TDD end user device, which is explained in more detail with respect to FIG. 8A, is configured to scan all frequencies for communications containing AP access information, such as secure control codes, AP identifiers and the like. After forwarding the secure control word to the end user device, the AP process 600 returns to receiving another encrypted secure control word at 605.

Alternatively, in response to a determination that the tuning control code has expired (i.e. "Yes") at 660, the AP must make a new channel allocation request and the process 600 returns to step 605, to receive an encrypted secure control word.

As noted in a TDD implementation, a single frequency may be allocated to the AP 501A for both transmitting and receiving, in which case the timing of the transmitting and receiving functions will alternate.

Of course, the encrypting method is maintained by the ASA controller 106 (decryption key) such that all other parties (chipset manufacturers, hardware device manufacturers, service providers, end users, and other interested parties) cannot circumvent nor compromise the security features. The secure synthesizer 530 in one embodiment may not have any back doors (i.e. coding that allows the bypass of the security features by, for example, an administrator or device manufacturer). The back doors may allow, for example, commands to stay on one frequency, to accept unencrypted instructions, or any other mechanisms that avoid the use of the secure tuning code word provided by the ASA controller 106. Otherwise, a firmware or software reflash can potentially exploit the back-door and allow circumvention of the secure synthesizer 530.

In this manner, any wireless air interface that does not have secure centralized network control of channel usage may, for example, use the internet protocol (IP) to provide over-the-top implementation of secure synthesizer tuning for secure channel allocation. In other words, an application is able to execute securely using the IP without requiring specific programming at an AP or EUD to provide the security.

Figure 7:
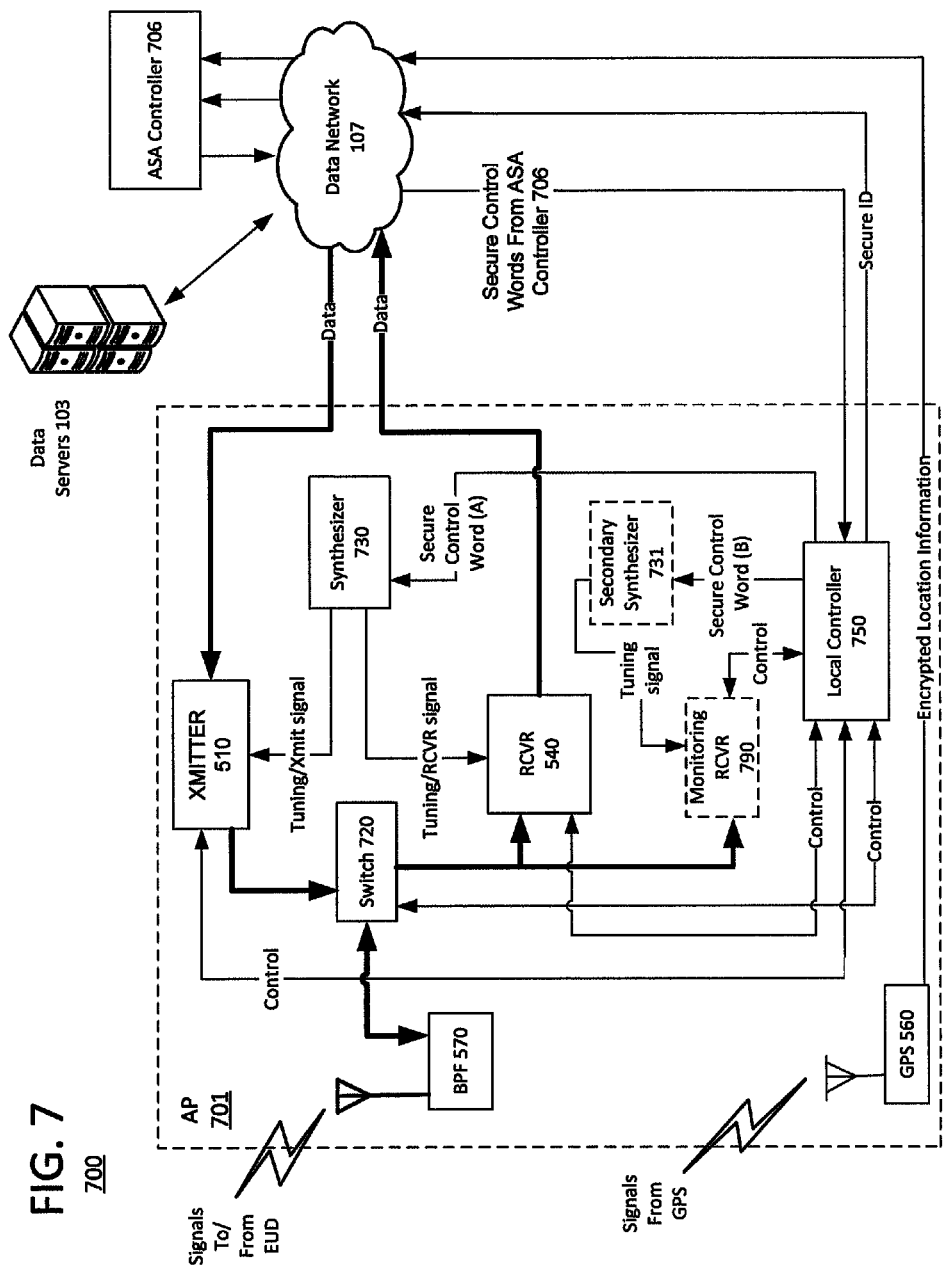
FIG. 7 is a high-level functional block diagram of an example of an access point that utilizes the shared radio frequency spectrum.

FIG. 7 is a high-level functional block diagram of an example of an access point device including a spectrum monitoring receiver that can be instructed to monitor or 'sniff' the shared radio frequency spectrum described in the examples herein. The system 700 includes elements that are similar to those described with respect to FIG. 5 above. For example, the data servers 103 and the data network 107 perform functions with respect to the access point 701 similar to those described with respect to FIG. 5, so no further explanation of those elements will be provided in the following discussion for sake of brevity. While the ASA controller 706 performs substantially the same functions as ASA controller 106, the ASA controller 706 includes additional functionality with respect to the spectrum monitoring (i.e. 'sniffing') receiver included with the example of access point 701. In addition, other elements, such as the receiver 540, GPS reporter 560, and the band pass filter 570, that perform similar functions as those described with respect to FIG. 5 are similarly numbered, and a separate discuss of those similar functions will not be provided with respect to FIG. 7 also for the sake of brevity.

The AP 701 is configured differently that the AP 501 described with respect to FIG. 5. The access point 701 includes a transmitter (XMITTER) 510, a switch 720 (which may be the same or different from 520), a synthesizer 730 (which may be the same or different from 530), a receiver (RCVR) 540, a monitoring receiver 790 (which may be the same or different from 540), a local controller 750, GPS receiver/reporter 560, and a band pass filter 570. Additional or revised components of AP 701 are configured to provide the additional functionality. For example, the revised components in AP 701 include switch 720, secure synthesizer 730, local controller 750, and monitoring receiver 790, and are configured to provide added functionality enabling the AP 701 to provide a channel traffic report to the ASA controller 706.

In an example, the AP 701 includes a local controller 750 that in addition to control connections to the synthesizer 730, transmitter 510 and receiver 540 as in FIG. 5, but also includes another control connection to the monitoring receiver 790.

Under control of a local controller 750, the AP 701 performs routing functions, for example, typical of a Wi-Fi router, but only in the frequency channel allocated by the ASA controller 706. However, in this example, of an access point, the AP 701 also provides the additional functionality of detecting data communication traffic on other channels of the shared radio frequency spectrum in the vicinity of the AP 701, and reporting the detected data communication traffic to the ASA controller 706.

For example, in order to better determine a KO zone, or determine the frequency channel that can be allocated to the AP 701 or an AP nearby to AP 701, it would be helpful if the ASA controller 706 had an indication of data traffic in the channels available for allocation from the shared radio frequency spectrum. In order to provide this functionality, the ASA controller 706 forwards a secure control word to the AP 701 in response to an access request from the AP 701. The ASA Controller 706 may then decide it wishes to process additional information from the requesting AP 701, or even from other nearby APs, in order to determine the local RF environment based upon the channels already in use by other nearby AP stations. By sampling some possible channels at the AP 701 or other nearby APs, the ASA controller 706 may decide that the KO zone may be allowed to be smaller without jeopardizing and causing interference, or that the KO zone must be larger, and the candidate channel cannot be made available for AP 701.

The ASA controller 706 may decide to sample (i.e. monitor or "sniff") on a candidate channel to determine if AP 701, or any nearby AP, can detect any usage (e.g. interference) from other nearby users on that channel. The secure control word transmitted by the ASA controller 706 is similar to the secure control word described with respect to FIG. 5 except the secure control word transmitted by the AP 701 includes additional control words. The ASA controller 706 may include the additional function of obtaining spectrum monitoring data from an AP as mentioned above with respect to FIGS. 3 and 4 and the different methods of determining KO zones. Spectrum monitoring data may include, for example, an indication of the channels in the shared radio frequency spectrum that the AP 701 detects via the monitoring (i.e. "sniffing") receiver 790 in the vicinity of the AP 701. In this case, the ASA controller 706 would provide receive-only tuning control words to indicate that the ASA controller 706 wished AP 701 to monitor (i.e. "sniff") the indicated channel and report the results back to the ASAS manager to make a further determination of possible channel allocations for AP 701 or surrounding AP units.

The ASA controller 706 may request spectrum monitoring data for several reasons in which case, the AP 701 may have different modes of operation. For example, the ASA controller 706 may be instructed to collect the spectrum monitoring data from an AP, such as AP 701, by a higher level controller in the ASAS 105 in order to update database 115 without providing the AP 701 access to that candidate channel of the shared radio frequency spectrum (i.e. a spectrum monitoring only mode, receive-only monitoring, where the candidate channel is not allocated to the 'sniffing' AP), in order to determine which channel from the channels available from the shared radio frequency spectrum should be allocated to the AP 701 (i.e. an allocation channel selection mode), and/or an arbitrary request to obtain spectrum monitoring data while the AP 701 has access to a channel of the shared radio frequency spectrum and is communicating with an EUD (i.e. update propagation data mode).

Depending upon the mode in which the AP 701 will be operating, the ASA controller 706, after receiving at least a secure position identifier from the GPS receiver/reporter 560, provides one or more control words to the AP 701. The ASA controller 706 may indicate the mode setting to the local controller 750 and/or the secure synthesizer 730 in a string of bits (e.g. a pair of bits) included in a field with the secure control words.

For example, a Tier 1 or Tier 2 user may have an interest in the traffic on a particular channel (e.g., specific equipment is configured for optimal operation in the particular channel and is sensitive to interference) so the particular channel and surrounding channels may be investigated. To provide the data needed to satisfy the investigation, the ASA controller 706 may determine a spectrum monitoring mode of all APs registered with the ASAS 105 or only those APs, such as AP 701, in a location relevant to the channel investigation are targeted. Location information, for example, received from GPS receiver/reporter 560 and maintained in the ASAS database 115 from previous AP access requests may be used to identify the location relevant APs. In this case, a spectrum monitoring-only mode may be selected by the ASA controller 706 for obtaining the needed channel usage data.

In the spectrum monitoring-only mode, the AP 701 may provide several spectrum monitoring secure control words that each correspond to one of a set of candidate channels in the shared radio frequency spectrum that the ASA controller 706 has selected for investigation based on an indication from ASAS 105. For example, the spectrum monitoring secure control words may correspond to channels in which the ASAS 105 is interested for purposes of refining propagation models for determining keep out zones, determining usage statistics for a particular AP or the like. The provided spectrum monitoring secure control words are not allocated use by the AP 701 for providing data network 107 access to an EUD, only for providing monitoring data to the ASA controller 706 (i.e. for 'sniffing'). The spectrum monitoring secure control words, similar to the other secure control words, expire after a pre-determined time period, but also include an indicator that identifies the monitoring receiver 790 as the receiver to be tuned using the spectrum monitoring secure control words.

Upon receipt of the several secure control words for each of the channels of interest, the local controller 750 forwards the several secure control words to the secure synthesizer 730. The secure synthesizer 750 decrypts the secure control words, either iteratively or as a batch, and tunes the monitoring receiver 790 to each of the respective channels for detected signals in the respective channels. The secure code words for each of the respective channels may include a tuning word and a tuning control code timestamp. The tuning control code timestamp may indicate an expiration for the respective tuning word that expires more quickly or more slowly than the expiration of a secure control word that is provided for the allocated communication channel (i.e. frequency channel) assigned to the AP 701. For example, the expiration time may be the same for each channel of interest or may vary, for example, based on a level of interest of the ASAS 105 in the traffic on a particular channel. As a result, the expiration time for each channel may be fixed or may vary depending upon instructions from the ASA controller 706.

In an allocation channel selection mode, the ASA controller 706 may be configured to include an instruction to obtain spectrum monitoring data whenever receiving an access request from a suitably configured AP, such as AP 701, in order to select a channel for allocation to the AP 701 for data communication use. The ASA controller 706 may provide a number of secure control words to the AP 701 that correspond to the candidate channels from the shared radio frequency spectrum. The provided secure code words include encrypted timing words and tuning words, as in the example described with respect to FIG. 5. The local controller 750 receives the secure control words as well as the bit values indicating the operating mode. The local controller 750 passes the secure control words, still encrypted, to the secure synthesizer 730 for decryption, and enters the configuration for providing detected signals or measured power levels for the respective channels of interest. The secure synthesizer 730 decrypts the secure control words, and tunes the monitoring receiver 790 to the respective channels until the signal detection expires according to the timing word, and the monitoring receiver is tuned to a next channel indicated by a next secure control word. The detected signals may be processed to determine or measure one or more signal parameters, such as a received signal strength, a power level, and/or a signal quality, to provide a report. For example, measured power levels (e.g., received signal strength indicator (RSSI)) may be formed into reports for individual delivery to the ASA controller 706. Alternatively, the measured power levels may be buffered in a memory (not shown) by the local controller 750, and provided as a batch to the ASA controller 706.

In response to receiving from the AP 701 local controller 750 the spectrum monitoring data obtained by the monitoring receiver 790, the ASA controller 706 may determine that no other candidate channels appear to be occupied as observed by the AP 701, or are at low enough powers that AP 701 or some other AP device nearby may, in fact, use that channel without adverse effects.

Or, as a result of finding an available channel, the ASA controller 706 may select any one (or a set) of the candidate channels from the available channels, for example, without concern for keep out zones, and send a secure control word corresponding to the selected channel (allocating that channel for AP 701 or some other nearby AP).

Alternatively, the ASA controller 706 may send a set of secure control words corresponding to the list of candidate channels. The local controller 750 in one embodiment will not have knowledge of which specific channels (i.e. the unencrypted channel numbers) are included in the list, but will receive one or more secure control words from which the local controller 750 and forward the one or more secure control words to the secure synthesizer 730 for monitoring (i.e. "sniffing"). The secure synthesizer 730 may iteratively tune to the channels indicated by the secure control words in the list corresponding to each candidate channel, and processes the signals on each channel to provide different signal parameters, such as receives signal strength indicators (RSSI) or the like. The monitoring receiver 790 forwards the results of the monitoring to the local controller 750, which forwards the monitoring results to the ASA controller 706. Based on the received monitoring results, the ASA controller 706 can select one secure control word that will be forwarded to the secure synthesizer 730 for decryption and tuning of the transmitter 510 and receiver 540.

In another example, a secondary synthesizer 731 may be used to monitor, or "sniff," other channels on a rolling basis. The secondary synthesizer 731 is a secure synthesizer configured in the same manner as synthesizer 730. The secondary synthesizer 731, via a control connection with the local controller 750, may receive a secure control word B. In an example, the secondary synthesizer 731 is configured as an application specific integrated circuit that provides for the secure decryption of the secure control word B codes. The secure code word B may include a set of encrypted rolling tuning codes in which each tuning code of the set includes an encrypted tuning word corresponding to a channel of the shared radio frequency spectrum, and an encrypted time stamp that indicates when the tuning word expires. The "rolling" indicates that the time stamp is as short as possible for collecting data useful for the needs of the ASA controller 706. For example, the time stamp for the tuning word may be tens to hundreds of milliseconds for the ASA controller 706 to determine signal traffic in the respective channels indicated by the rolling tuning codes in secure control word (B).

If the spectrum sensing is to occur when the TDD or FDD system is not actively receiving traffic, the AP of FIG. 5 and synthesizer 530 can be used where the conventional traffic receiver is retuned temporarily to another frequency for spectrum sensing purposes. If the timing is such that the synthesizer 530 cannot retune fast enough to support both traffic reception and transmission, as well as the additional interleaved spectrum sensing tasks, then the architecture of FIG. 7 may be used. Similarly, if the spectrum sensing is intended to occur simultaneously, on another frequency channel, while the AP supports traffic reception and transmission, then the architecture of FIG. 7 is deployed. The secondary synthesizer 731 also facilitates non-alternating, simultaneous reception use in a frequency division duplex implementation in which the respective receivers 540 and 790 are able to be tuned to two different channels simultaneously.

In an alternative example, the AP 701 is configured to provide channel signal monitoring when not be equipped with the monitoring receiver 790 and the secondary synthesizer 731. When configured without the monitoring receiver 790 and the secondary synthesizer 731, the synthesizer 730 can be provided with secure control words that include tuning words for the channels of interest, and when the receiver 540 and transmitter 510 are not in use (i.e. exchanging data with an EUD) the synthesizer 730 can tune to the channels of interest, and the receiver 540 can collect the signal data for the respective channels of interest. In this case, the tuning words may have a time stamp that is of longer duration to account for the potential conflict with the AP 701 being actively engaged with an end user device (i.e. when the AP 701 is exchanging data with an EUD).

In an alternative example, the ASAS 105 may instruct the ASA controller 706 to obtain channel usage data to update propagation data. In response, the ASA controller 706 instructs the AP 701 to enter an update propagation data mode. The update propagation mode may occur while the transmitter 510 and receiver 540 of AP 701 are tuned to an authorized channel that is providing bidirectional communication to/from an EUD and thus access to the data network 107. While the transmitter 510 and receiver 540 are tuned to the authorized channel used by the AP and the served EUD, the second secure 'sniffing' synthesizer 731 may be provided with a signal indicating which candidate channel(s) is (Are) to be monitored by monitoring RCVR 790. The ASA controller 706 supplies an indicator signal for the change in mode, and secure control word(s) corresponding to the candidate channels in which the ASAS 105 is interested in measuring in order to update the propagation models. Upon receipt of the secure control words corresponding to the candidate channels of interest, the secure synthesizer 731 may be enabled, and tune the monitoring receiver 790 to the candidate channel(s) indicated by the secure control word(s).

Of course, the AP 701 may have a 'regular' mode of operation similar to the mode of operation of AP 501 in which the monitoring receiver 790 and its supporting synthesizer 731 are not used to monitor any candidate channel usage data, or is only tuned to the 'regular' authorized channel that the receiver 540 is also tuned to, perhaps for diversity reception of the regular authorized channel. The receiver 790 does not 'receive' the candidate signals, as it may not decode them (e.g. for privacy purposes), the receiver 790 only monitors the received candidate signal for RSSI power level.

In another example, the 'regular' receiver 540 in FIG. 5A may be configured to provide the 'sniffing' monitoring functions by using a candidate channel tuning from synthesizer 530 to sample a candidate channel for the RSSI power level while the transmitter 510 and the 'regular' reception function on an authorized channel for Receiver 540 are idle. In these idle times, receiver 540 can be retuned to a candidate channel for monitoring.

In another example, the receiver 540 in either of FIG. 5 or 7 may be configured to provide an indication of the quality of the channel (a quality of service (QOS) report) (e.g. number of bits lost, or corrupted, number of requests for retransmission of data and the like) about the authorized reception channel to the ASA controller 706 or 106. For example, the local controller 750/550 of AP 701/501 may indicate to the ASA controller 706/106 that the authorized channel 3 is degraded each time it is assigned to the AP 701/501. As a result, the ASA controller 706/106 may, for example, determine that an adjacent channel is too close in distance to another user using the same channel (co-channel), or some other problem exists.

FIG. 8A is a high-level functional block diagram of an example of an end user device (EUD) that utilizes the shared radio frequency spectrum system. The end user device 801A is part of system 800A that includes the end user device 801A and a local client 880. The end user device (EUD) 801A is served by its local host access point, such as access point (AP) 501A. The local client 880 may be a device, such as a tablet, a laptop, a dongle connectable to a data port (e.g. universal serial bus (USB) port, mini-USB port), desktop computer, gaming device, media player or the like. Note that the EUD 801A does not include a GPS receiver/reporter as does the AP 501A. The location of the EUD 801A is presumed to be the location of the local serving AP, such as AP 501A, because the EUD 801A is a low power device small radius of adequate performance) and is known to be served by the local access point.

The TDD EUD 801A device is configured similar to the AP 501A, and includes a transmitter 810, duplexer switch 820, secure synthesizer 830, and a local controller 850. In addition, the EUD 801A is further configured to receive its control signals from the serving AP, such as AP 501A or 701, to which the EUD 801A is wirelessly connected. For example, the AP 501A may generate a signal indicating the APs availability for connecting any EUD in the vicinity of the AP to the data network. The EUD 801A may standby in a detection state to detect AP signals. By being in a detect only state (receive-only), the EUD 801A cannot interfere with any communications of higher tiered users in channels of the shared radio frequency spectrum that may be allocated in the vicinity of EUD 801A. In addition, the EUD 801 may not have a permanently assigned serial number or user identity that is separate or unique from the serving access point.

The tuning permission signal transmitted by the AP 501A may include transmission of the secure control word used for tuning the AP transmitter 510 and receiver 530, so the EUD 801A can transmit and receive in the same channel allocated to the AP 501A. The EUD 801A secure synthesizer 830 is configured similar to the AP 501A secure synthesizer, and functions to parse and obtain the tuning words and timing words needed for communicating with the appropriate AP. For example, signals received from the AP 501A may include the secure control word, the secure ID for the AP 501A, and, perhaps, an EUD device identifier to uniquely identify the EUD 801A to the AP 501A. The secure control words, the secure ID for the AP 501A, and the EUD identifier are supplied via the AP 501A as the EUD has no direct connectivity (wired or wireless) to the data network 107 (i.e. Internet), the ASA controller 106 or the ASAS 105.

Upon receipt of the secure control word, the EUD 801A secure synthesizer 830 may perform the same functions as described above with respect to the secure synthesizer 530.

For example, the process 600 of FIG. 6 may be executed by the EUD 801A to communicate with the AP 501A. Once tuned to the proper transmitter 810 and receiver 840 frequencies, the EUD 801A may facilitate communication by the local client with the AP 501A and, via AP 501A back to/from the data network 107 (i.e. the Internet connection).

Figure 8B:
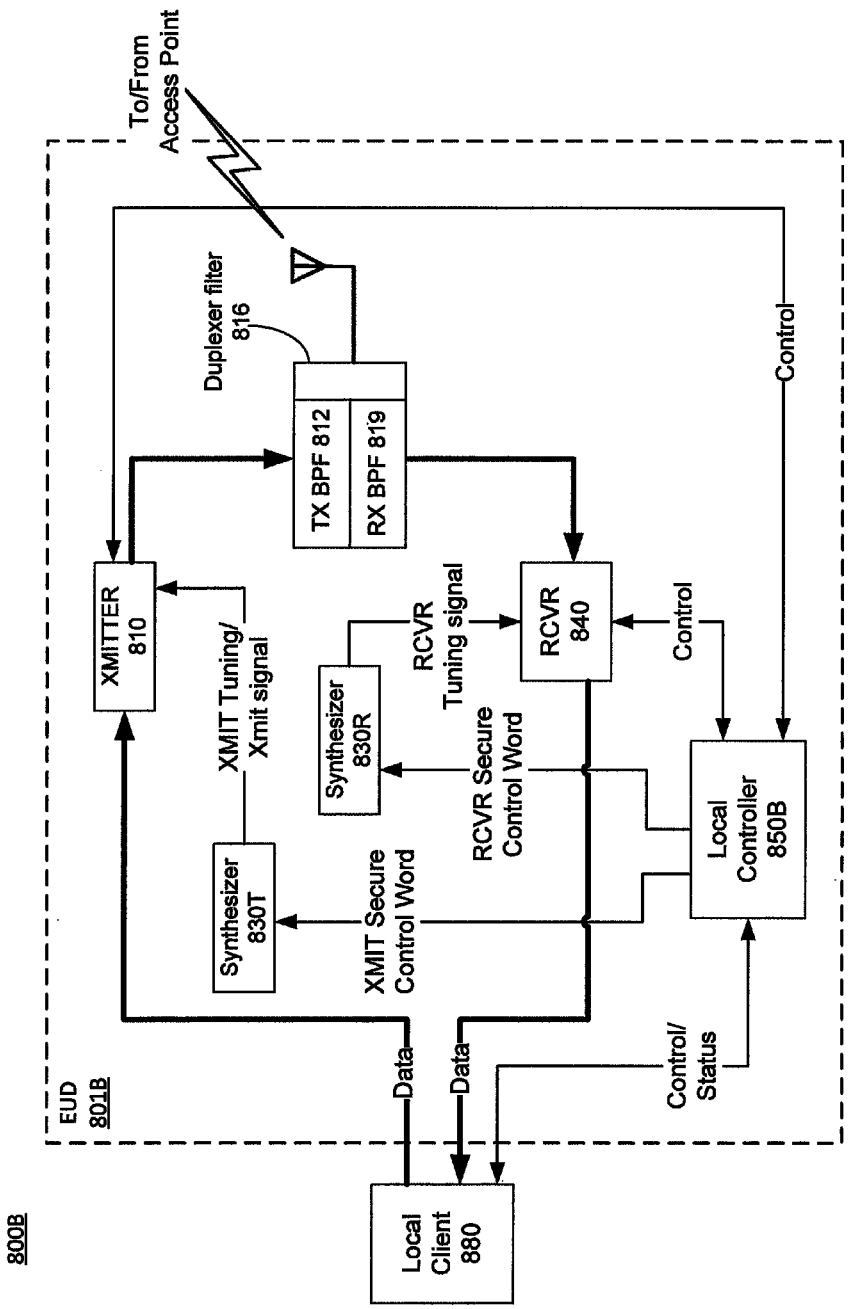
FIG. 8B is a high-level functional block diagram of an example of an end user device implemented in a frequency division duplex (FDD) configuration for providing access to shared radio frequency spectrum.

FIG. 8B is a high-level functional block diagram of an example of an end user device implemented in a frequency division duplex (FDD) configuration for providing access to shared radio frequency spectrum. The system 800B includes an FDD-configured EUD 801B that interacts with the local client 880. As for the components of EUD 801B, the transmitter 810 and the receiver 840 are configured the same in EUD 801B as the same components in the EUD 801A of FIG. 8A. However, instead of synthesizer 820, which provides a single tuning signal to both the transmitter 810 and receiver 840, which are configured to provide a TDD implementation of an EUD, as in FIG. 8A, the FDD-configured AP 801B uses a pair of synthesizers 530T (coupled to the transmitter 810) and 530R (coupled to the receiver 840. In addition, the local controller 850B is configured to operate according to an FDD implementation that does not require the operation of switch 820 of the AP 801A.

In FDD systems, the transmitter 810 and receiver 840 functions may operate simultaneously or substantially simultaneously, and the duplexer or diplexer switch (e.g., 820 in FIG. 8A) is replaced by a duplexer filter 816 (also known as a diplexer filter). The duplexer filter 816 is connected to the antenna, and has two separate branches, one supported by a band pass filter (BPF) tuned to the transmitter band (i.e., TX BPF 812), and the second branch supported by a BPF tuned to the receiver band (i.e., RX BPF 819). The duplexer filter 816 is configured to provide the duplexing functionality to allow the receiver to receive signals on the first frequency channel and to transmit signals on the second frequency channels. The secure control word in a FDD implementation may include at least a pair of secure controls words (e.g., one for transmitter tuning and another for receiver tuning) are provided by the ASA controller 106. Each of the individual secure control words in the pair of secure control words is different from the other secure control word in the pair, and will not be decrypted to produce the same frequency channel for tuning of the transmitter 810 and receiver 840.

For example, the local controller 850B is configured to provide a receiver (RCVR) secure control word to receiver secure synthesizer 830R and a transmitter (XMIT) secure control word to a transmitter secure synthesizer 830T. The local controller 850B is configured to identify the respective secure control words. For example, the secure control words provided by the AP may include a data field indicating whether the secure control word is intended for transmitter or receiver. In other embodiments, the order of the secure control word may always be the same. In other words, the secure control words delivered by the AP may always have the receiver secure control word first and the transmitter secure control word second, or vice versa. The respective secure synthesizer (830R and 830T) generates a tuning signal that is, output to the receiver 840 and transmitter 810, respectively. For example, the receiver secure synthesizer 830R receives the receiver (RCVR) secure control word from the local controller 850B, processes the secure control word to derive a receiver tuning signal. The derived receiver tuning signal may correspond to a first frequency channel. The receiver 840 uses the derived receiver tuning signal to tune to the first frequency channel. In a similar fashion, the transmitter secure synthesizer 830T receives the transmitter (XMIT) secure control word from the local controller 850B, processes the XMIT secure control word to derive a transmitter tuning signal. The derived transmitter tuning signal may correspond to a second frequency channel that is different from the first frequency channel. The transmitter 810 uses the derived transmitter tuning signal to tune to the second frequency channel.

The EUDs 801A and 801B are examples of devices that may be coupled to local client devices 880 to provide connectivity to access points implementing either TDD or FDD signal protocols, respectively.

The foregoing paragraphs described configurations and implementations of access points and end user devices for use in a shared access system. The described configuration and implementations protect the licensee's use of a band of frequency channels from interference and other adverse effects caused by others' unauthorized use of the band of frequency channels. The described configurations utilize a combination of secure information to insure that the locations and specific frequency channels used by the described access points and end user devices remain secure when transmitted and used by the respective devices. The described secure synthesizer may be utilized in access points as well as end user devices to allow the access points and end user devices to operate in the frequency channels allocated by the ASA controller.

Figure 9:
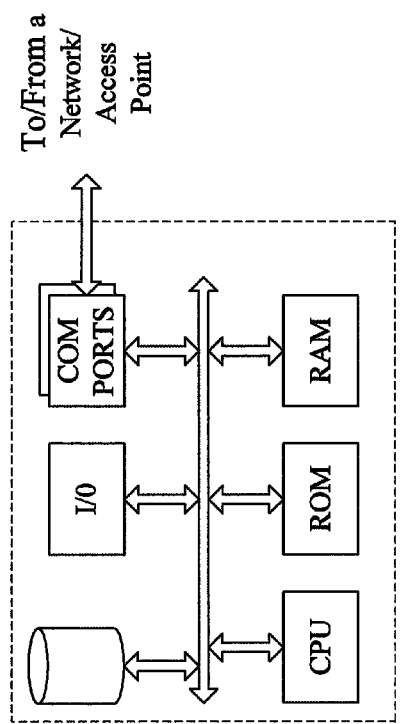
FIG. 9 is a simplified functional block diagram of a computer that may be configured, for example, to function as a controller or secure synthesizer in, or coupled to, an access point and/or an end user device in the examples of an authorized shared access system of FIGS. 1-8.

FIG. 9 provides functional block diagram illustrations of general purpose computer hardware platforms for implementing one or more of the examples of a local controller, secure synthesizer, or the ASA controller.

A general purpose computer configured to operate as a controller or synthesizer device within an access device or end user device, for example, includes a data communication interface for packet data communication. The device also includes a central processing unit (CPU), in the form of one or more processors, for executing program instructions. The device platform typically includes an internal communication bus, program storage and data storage for various data files to be processed and/or communicated by the device, although the device often receives programming and data via network communications. The hardware elements, operating systems and programming languages of such devices are conventional in nature. Of course, the device functions may be implemented in a distributed fashion on a number of similar platforms, to distribute the processing load.

Hence, aspects of the methods of shared radio frequency spectrum access outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the authorized shared access system 105 into the computer platform of the ASA controller, access point and end user device that will allow the end user device to access a data network through an access point controlled by the ASA controller. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the ASA controller, access point and/or end user device shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A shared radio frequency spectrum access point device, comprising:
   a transmitter configured to transmit signals over-the-air to an end user device;
   a receiver configured to receive signals from the end user device;
   a connection to an external network via a wired or wireless interface that uses a communication channel different from the shared frequency spectrum;
   a local controller configured to control operation of the access point device and configured to receive control signals from an external managing controller, wherein the local controller receives a communication channel allocation for the transmitter and receiver from the external managing controller via the connection with the external network; and
   a secure synthesizer configured to perform functions, including:
      in response to receiving a secure control word from the external managing controller, via the local controller, to decrypt the secure control word; and
      based on the decrypted secure control word, output a tuning signal corresponding to the allocated communication channel in the shared radio frequency spectrum.

2. The access point device of claim 1, wherein the receiver is configured to receive the outputted tuning signal and tune to a first communication channel based on the outputted tuning signal, wherein the secure synthesizer is coupled to the receiver.

3. The access point device of claim 2, further comprising:
   a transmitter secure synthesizer configured to:
      receive the outputted tuning signal;

tune the transmitter to a second communication channel based on the outputted tuning signal, wherein the second communication channel is different from the first communication channel; and transmit data signals to an end user device via the second communication channel.

4. The access point device of claim 1, wherein the local controller is further configured to perform functions, including functions to:

receive an updated secure control word after a time interval, wherein the updated secure control word indicates a change of allocated communication channel;

forward the updated secure control word to the secure synthesizer; and transmit the updated secure control word to the end user device.

5. The access point device of claim 4, wherein the secure synthesizer is further configured to perform functions, including functions to:

receive the updated secure control word forwarded from the local controller;

decrypt the updated secure control word;

identify a tuning word in the updated secure control word; and output a tuning signal corresponding to another communication channel indicated by the identified tuning word, wherein the other communication channel is different from the allocated communication channel.

6. The access point device of claim 1, further comprising:

a monitoring receiver communicatively coupled to a secondary secure synthesizer, wherein the monitoring receiver is configured to detect signals in multiple communication channels after a predetermined time interval, wherein each of the multiple communication channels are different from the allocated communication channel.

7. The access point device of claim 6, wherein the secondary secure synthesizer is configured to perform functions, including functions to:

receive spectrum monitoring secure control words from the external managing controller, wherein the spectrum monitoring secure control words correspond to candidate communication channels to be monitored, wherein the spectrum monitoring secure control words expire after a pre-determined time period and include an indicator identifying the monitoring receiver as the receiver to be tuned;

decrypt each of the spectrum monitoring secure control words;

identify a tuning word in each of the decrypted spectrum monitoring secure control words, wherein the tuning word indicates a unique communication channel within the shared radio frequency spectrum, and iteratively tune the monitoring receiver according to a unique communication channel indicated by the respective tuning word from each decrypted spectrum monitoring secure control word before the expiration of the decrypted spectrum monitoring secure control word.

8. The access point device of claim 1, further comprising:

a monitoring receiver communicatively coupled to a secondary secure synthesizer to allow the access point to simultaneously receive in the allocated communication channel and multiple other communication channels, wherein the multiple other communication channels are different from the allocated communication channel.

9. The access point device of claim 8, wherein the monitoring receiver is configured to perform functions, including functions to:

in response to receiving additional secure control words from the secondary secure synthesizer, iteratively tune to a communication channel indicated by each of the additional secure control words for a predetermined monitoring time;

for each communication channel, monitor communication activity on the communication channel during the predetermined monitoring time before tuning to a next communication channel based on a next additional secure control word; and return at least one of received signal strength, power level, signal quality, or monitored communication activity on the respective communication channels to an external managing network.

10. The access point device of claim 1, further comprising:

a global positioning system (GPS) receiver/reporter configured to transmit an encrypted position of the access point device to an external controller in a GPS communication path for secure communication between the GPS receiver/reporter and the external managing controller, wherein the GPS communication path is separate from the connection to the external network, and the GPS receiver/reporter is configured to perform functions, including functions to:

determine position coordinates of the access point from signals received from GPS satellites;

encrypt the position coordinates; and convey the encrypted position coordinates to the external managing controller.

11. The access point device of claim 10, wherein the local controller is further configured to perform functions, including functions to:

retrieve a stored secure identifier of the access point device from a local memory;

convey the retrieved secure identifier in a request for communication to the external managing controller;

after conveyance of both the secure identification by the local controller and the encrypted position coordinates by the GPS receiver/reporter, to receive encrypted control signals from the external managing controller, wherein at least one of the encrypted control signals is the secure control word;

forward the secure control word to the secure synthesizer; and transmit the secure control word to the end user device.

12. A method, comprising steps of:

transmitting, by a position determination component of an access point device, position coordinates of the access point device in a secure communication to an external managing controller;

transmitting, in response to control instructions from a local controller of the access point device, a secure identifier of the access point device in a secure communication to the external managing controller;

after transmission of both the position coordinates of the access point and the secure identifier of the access point, receiving, by the local controller, a secure control word from the external managing controller, wherein the secure control word is encrypted;

decrypting, by a secure synthesizer, the secure control word to provide a tuning word, wherein only the secure synthesizer is able to decrypt the secure control word;

tuning, by the secure synthesizer, a receiver and transmitter to a communication channel identified in the tuning word provided by decrypting secure control word; and forwarding the encrypted secure control word to an end user device to permit communication between the access point device and the end user device.

13. The method of claim 12, further comprising steps of:

after a time interval, receiving a new secure encrypted control word at the synthesizer, wherein the time interval is determined by the external managing controller and based on communication channel allocation decisions of the external managing controller.

14. The method of claim 12, further comprising steps of:

receiving at the access point a data communication from an end user device, wherein the data communication includes at least audio data, video data or document data;

in response to receiving the data communication from the end user device, forwarding the data communication to the transmitter; and sending the data communication to an external network via the transmitter.

15. The method of claim 12, further comprising steps of:

receiving, by the local controller, an updated secure control word, wherein the updated secure control word is encrypted;

forwarding the updated secure control word to the secure synthesizer;

transmitting the updated secure control word to the end user device;

decrypting, by the secure synthesizer, the updated secure control word; and after a predetermined communication time period, retuning the transmitter and receiver to another communication channel for continued communicating with the end user device.

16. The method of claim 12, further comprising steps of:

receiving spectrum monitoring secure control words from the external managing controller, wherein the spectrum monitoring secure control words expire after a pre-determined time period and include an indicator identifying a monitoring receiver to be tuned using the spectrum monitoring secure control words, wherein the monitoring receiver is an additional receiver in the access point device;

decrypting, by a second secure synthesizer, each of the spectrum monitoring secure control words, wherein the second secure synthesizer is configured to tune the monitoring receiver;

identifying a tuning word in each of the decrypted spectrum monitoring secure control words, wherein the tuning word indicates a unique communication channel within a shared radio frequency spectrum, and iteratively tuning the monitoring receiver according to the unique communication channel indicated by the respective tuning word from each decrypted spectrum monitoring secure control word before the expiration of the spectrum monitoring secure control word after the predetermined time period.

17. The method of claim 16, further comprising steps of:

detecting signals on each unique communication channel as the monitoring receiver is iteratively tuned to the unique communication channel indicated by the respective tuning word; and forwarding the detected signals or a measured one or more of a received signal strength, a power level, a signal quality, to the external managing controller.

18. A device, comprising:

an application specific integrated circuit, configured to perform functions, including functions to:

receive an encrypted secure control word, wherein the encrypted secure control word includes an expiration time stamp;

decrypt the encrypted secure control word;

determine that the secure control word has not expired based on the expiration time stamp; and in response to the determination that the secure control word has not expired, tune a receiver or transmitter synthesizer to a communication channel indicated by the decrypted secure control word, wherein the communication channel allows the device to exchange data with a remote device.

19. The device of claim 18, wherein the application specific integrated circuit, is further configured to perform functions, including functions to:

receive an encrypted timing word;

decrypt the received timing word, wherein the decrypted timing word indicates a duration of a communication time interval; and set a duration for establishment of the communication channel based on the duration indicated by the communication time interval.

20. The device of claim 19, wherein the application specific integrated circuit is configured to perform functions, including functions to:

receive spectrum monitoring secure control words from an external managing controller, wherein the spectrum monitoring secure control words expire after a pre-determined time period and include an indicator identifying a monitoring receiver as a receiver of the device to be tuned;

decrypt each of the spectrum monitoring secure control words;

identify a tuning word in each of the decrypted spectrum monitoring secure control words, wherein the tuning word indicates a unique communication channel within a shared radio frequency spectrum, and iteratively tune the monitoring receiver according to the unique communication channel indicated by the respective tuning word from each decrypted spectrum monitoring secure control word before the expiration of the spectrum monitoring secure control word.

* * * * *